(12) United States Patent
Kawada et al.

(10) Patent No.: US 7,416,120 B2
(45) Date of Patent: Aug. 26, 2008

(54) COMMODITY INFORMATION PROPOSAL SYSTEM

(75) Inventors: Yohei Kawada, Yokohama (JP); Yoshihiro Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/411,027

(22) Filed: Apr. 26, 2006

(65) Prior Publication Data

US 2006/0261162 A1 Nov. 23, 2006

(30) Foreign Application Priority Data

May 12, 2005 (JP) .............................. 2005-139869

(51) Int. Cl.
*G06K 15/00* (2006.01)
(52) U.S. Cl. .......................... 235/383; 235/385; 705/22
(58) Field of Classification Search ................. 235/383, 235/385; 340/572.1; 705/22
See application file for complete search history.

(56) References Cited

U.S. PATENT DOCUMENTS 6,129,274 A * 10/2000 Suzuki ....................... 235/381
6,507,279 B2 * 1/2003 Loof ........................ 340/572.1
6,747,560 B2 * 6/2004 Stevens, III .............. 340/572.4
2002/0139846 A1 * 10/2002 Needham et al. ............ 235/383
2005/0190060 A1 * 9/2005 Clancy et al. ............ 340/572.9

FOREIGN PATENT DOCUMENTS

JP 2004-246887 9/2004

OTHER PUBLICATIONS

Sougoushouken, Merchandise Identification System, English machine translation, 2004, publication No. JP 2004-246887.*

* cited by examiner

*Primary Examiner*—Michael G. Lee
*Assistant Examiner*—Carol Hesse
(74) *Attorney, Agent, or Firm*—Mattingly, Stanger, Malur & Brundidge, PC

(57) ABSTRACT

An identifier such as an IC tag attached to a commodity is read by an antenna connected to a display rack or an information terminal. A server receives the read result, analyse the purchase action of the customer from the identifier ID, the antenna position information, etc, and proposes a totalization result. For example, detailed information of purchase actions for each customer such as a read result for each commodity and a commodity simultaneously read is displayed on terminals for the manager of the shop and managers at headquarters. The totalization result is displayed for the customer as a popular or good selling commodity of the shop on an information terminal inside the shop.

10 Claims, 24 Drawing Sheets

| 3611 | 3612 | 3613 | 3614 | 3615 | 3616 |
|---|---|---|---|---|---|
| COMMODITY CODE | COMMODITY NAME | TYPE | PRICE | ATTRIBUTE 1 (SIZE) | ATTRIBUTE 2 (COLOR) |
| SF213-01-74 | DENIM PANTS BLUE 74 | PANTS | 9,980 | 74 | BLUE |
| SF213-01-78 | DENIM PANT BLUE 78 | PANTS | 9,980 | 78 | BLUE |
| SF213-02-04 | DENIM PANTS BLACK 74 | PANTS | 9,980 | 74 | BLACK |
| AC765-02-02 | LEATHER JACKET BLACK M | JACKET | 39,980 | M | BLACK |
| ES902-03-01 | CHARACTER T SHIRT WHITE S | T SHIRT | 4,980 | S | WHITE |

| 3621 | 3622 |
|---|---|
| COMMODITY TAG ID | COMMODITY CODE |
| 3241BAE134325 | SF213-01-74 |
| 3211BAE453521 | SF213-01-74 |
| 12343ABC98765 | AC765-02-02 |
| 2468CDE565788 | AC765-02-02 |
| 16578ECB57885 | ES902-03-01 |
| AFEFF34589183 | ES902-03-01 |

| ACTION ID | COMMODITY TAG ID | ACTION | TIME | ANTENNA ID | SIMULTANEOUS READ COMMODITY TAG ID |
|---|---|---|---|---|---|
| 0001 | 3241BAE134325 | RACK (PICK-UP) | 2004/12/15 13:14:29 | 01234 | |
| 0002 | 3241BAE134325 | INFORMATION TERMINAL REFERENCE | 2004/12/15 13:21:54 | 98765 | |
| 0003 | 3241BAE134325 | CARRYING INTO FITTING ROOM | 2004/12/15 13:23:27 | 56789 | |
| 0004 | 3241BAE134325 | RACK (RETURN) | 2004/12/15 13:29:20 | 01234 | |
| 0005 | 3241BAE134325 | RACK (PICK-UP) | 2004/12/15 17:23:17 | 01234 | |
| 0006 | 3241BAE134325 | CARRYING INTO FITTING ROOM | 2004/12/15 17:40:27 | 56789 | ZYX123456789A |
| 0007 | 3241BAE134325 | PAYMENT AT CASH REGISTER | 2004/12/15 18:00:11 | 13579 | AFEFF34589183 |

FIG. 4

| PURCHASE ACTION No. | COMMODITY TAG ID | TOTAL POINT | PURCHASE | OCCURRENCE DATE | CORRESPONDING ACTION ID |
|---|---|---|---|---|---|
| 011 | 3241BAE134325 | 9 | NO | 12/15 | 0001,0002,0003, 0004 |
| 025 | 3241BAE134325 | 17 | YES | 12/15 | 0005,0006,0007 |
| 030 | 12343ABC98765 | 5 | NO | 12/21 | 0008,0009 |

391 — 3911, 3912, 3913, 3914, 3915, 3916

39

37

| ACTION | DONATED POINT |
|---|---|
| RACK (PICK-UP) | 1 |
| RACK (RETURN) | 0 |
| CARRYING INTO FITTING ROOM | 5 |
| INFORMATION TERMINAL REFERENCE | 3 |
| PDA REFERENCE FOR SHOP CLERK | 4 |
| PAYMENT AT CASH REGISTER | 10 |
| RACK → FITTING ROOM | 1 |
| FITTING ROOM → RACK | 0 |
| RACK → CASH REGISTER | 8 |
| INFORMATION TERMINAL → FITTING ROOM | 3 |
| FITTING ROOM → INFORMATION TERMINAL | 3 |
| FITTING ROOM → SHOP CLERK PDA | 4 |

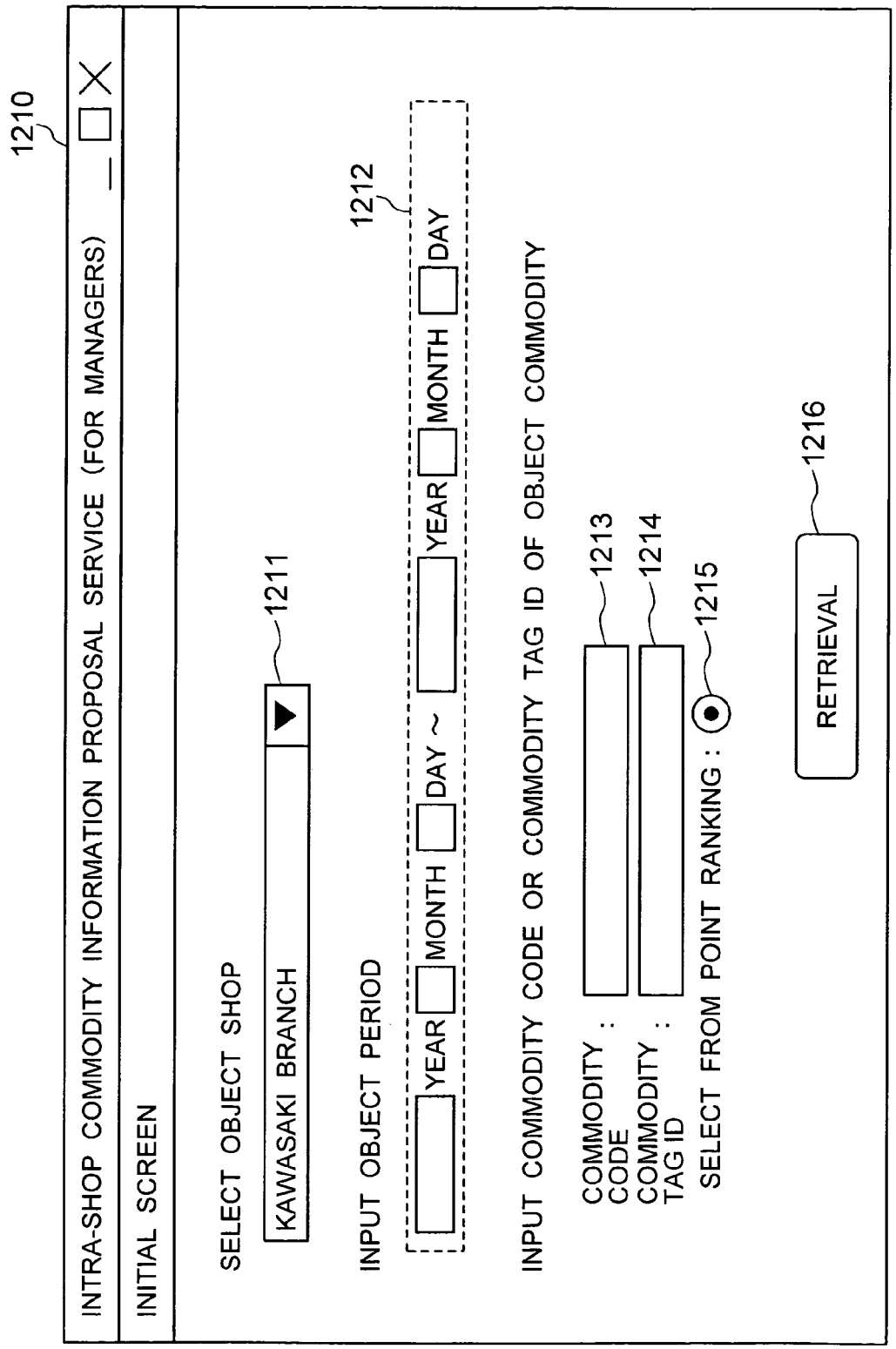

FIG. 9

INTRA-SHOP COMMODITY INFORMATION PROPOSAL SERVICE (FOR MANAGERS)   _ □ X   1260

POINT RANKING DISPLAY

ACQUIRED POINT RANKING TABLE DURING DECEMBER 1, 2004 TO DECEMBER 31, 2004

| RANK | COMMODITY CODE | COMMODITY NAME | TOTAL POINT | PURCHASE NUMBER |
|---|---|---|---|---|
| 1 | HG876-02-02 | DENIM JACKET, BLUE M | 97 | 8 |
| 2 | SF213-01-78 | DENIM PANTS, BLUE 78 | 72 | 4 |
| 3 | GH987-01-01 | LEATHER JACKET, BLACK S | 58 | 3 |
| 4 | SF213-01-74 | DENIM PANTS, BLUE 74 | 51 | 1 |
| 5 | ES902-03-02 | CHARACTER T SHIRT, WHITE M | 35 | 2 |

INTRA-SHOP COMMODITY INFORMATION PROPOSAL SERVICE (FOR MANAGERS) — □ × — 1290

COMMODITY TAG ID TABLE SCREEN

COMMODITY TAG ID TABLE OF COMMODITY CODE SF213-01-74 AND COMMODITY NAME "DENIM PANTS, BLUE 74" DURING PERIOD OF DECEMBER 1, 2004 TO DECEMBER 31, 2004

| COMMODITY TAG ID | STATUS | OCCURRENCE DATE OF LATEST PURCHASE ACTION | PURCHASE DATE | TOTAL POINT |
|---|---|---|---|---|
| 3211BAE453521 | NOT SOLD | 2004/12/13 | | 19 |
| 1234567ABCDE | NOT SOLD | 2004/12/12 | | 0 |
| 3241BAE134325 | SOLD | 2004/12/15 | 2004/12/15 | 30 |
| F987E654DCBA | NOT SOLD | 2004/12/16 | | 1 |
| 46871BDE3455 | NOT SOLD | 2004/12/21 | | 1 |

| INTRA-SHOP COMMODITY INFORMATION PROPOSAL SERVICE (FOR MANAGERS) | _ □ X |
|---|---|

PURCHASE ACTION TABLE SCREEN

CUSTOMER'S PURCHASE ACTION TABLE OF COMMODITY ID 3241BAE13425, COMMODITY CODE SF213-01-74 AND COMMODITY NAME "DENIM PANTS, BLUE 74" DURING PERIOD OF DECEMBER 1, 2004 TO DECEMBER 31, 2004

| PURCHASE ACTION No. | TOTAL POINT | PURCHASE | OCCURRENCE DATE |
|---|---|---|---|
| 002 | 1 |  | 2004/12/12 |
| 005 | 2 |  | 2004/12/13 |
| 009 | 1 |  | 2004/12/14 |
| 011 | 9 |  | 2004/12/15 |
| 025 | 17 | ○ | 2004/12/15 |

FIG. 12

| INTRA-SHOP COMMODITY INFORMATION PROPOSAL SERVICE (FOR MANAGERS) | — ☐ ✕ |
|---|---|

1310

ACTION TABLE SCREEN

CONTENT OF CUSTOMER'S PURCHASE ACTION No.025 OF COMMODITY ID 3241BAE13425, COMMODITY CODE SF213-01-74 AND COMMODITY NAME "DENIM PANTS, BLUE 74" AT DECEMBER 15, 2004

| ACTION | READ TIME | ANTENNA ID | ACQUIRED POINT | SIMULTANEOUS READ COMMODITY |
|---|---|---|---|---|
| RACK (PICK-UP) | 17:23:17 | 01234 | 1 | |
| → CARRYING INTO FITTING ROOM | 17:40:27 | 56789 | 5 | ZYX123456789A |
| → PAYMENT AT CASH REGISTER | 18:00:11 | 13579 | 0 | |
|  |  |  | 10 | AFEFF34589183 |

| INTRA-SHOP COMMODITY INFORMATION PROPOSAL SERVICE (FOR CUSTOMERS) | — □ × |
|---|---|

— 2050

INVENTORY INFORMATION SCREEN

INVENTORY STATUS OF SHOP OF COMMODITY HAVING DIFFERENT SIZES AND DIFFERENT COLORS FROM COMMODITY CODE SF213-01-74 AND COMMODITY NAME "DENIM PANTS, BLUE 74"

PUSH "INVENTORY STATUS" BUTTON OF SIZES AND COLORS FOR CONFIRMATION OF INVENTORY

— 2051

| COLOR/SIZE (WAIST) | BLUE | BLACK | BROWN | BEIGE |
|---|---|---|---|---|
| 70 | INVENTORY STATUS | INVENTORY STATUS | INVENTORY STATUS | INVENTORY STATUS |
| 74 | INVENTORY STATUS | INVENTORY STATUS | INVENTORY STATUS | INVENTORY STATUS |
| 78 | INVENTORY STATUS | INVENTORY STATUS | INVENTORY STATUS | INVENTORY STATUS |
| 82 | INVENTORY STATUS | INVENTORY STATUS | INVENTORY STATUS | INVENTORY STATUS |
| 86 | INVENTORY STATUS | INVENTORY STATUS | INVENTORY STATUS | INVENTORY STATUS |

2052 — 2056

COMMODITY OF SIZE [78] AND COLOR OF [BLUE] [EXISTS IN INVENTORY]

| ACTION ID 3811 | COMMODITY TAG ID 3821 | ACTION 3812 | TIME 3813 | ANTENNA ID 3814 | SIMULTANEOUS READ COMMODITY TAG ID 3815 | INVENTORY STATUS 3822 |
|---|---|---|---|---|---|---|
| 0011 | 3241BAE134325 | RACK (PICK UP) | 2004/12/15 13:14:29 | 01234 | | |
| 0012 | 3241BAE134325 | REFERENCE TO INFORMATION TERMINAL | 2004/12/15 13:21:54 | 98765 | | |
| 0013 | #SF213-01-78 | INVENTORY REFERENCE | 2004/12/15 13:22:28 | 98765 | | YES |
| 0014 | #SF213-02-78 | INVENTORY REFERENCE | 2004/12/15 13:22:51 | 98765 | | NO |
| 0015 | 3241BAE134325 | CARRYING INTO FITTING ROOM | 2004/12/15 13:23:27 | 56789 | | |
| 0016 | 3241BAE134325 | (RETURN TO) RACK | 2004/12/15 13:29:20 | 01234 | 567EBC8276765 | |

FIG. 18

INTRA-SHOP COMMODITY INFORMATION PROPOSAL SERVICE (FOR MANAGERS)  — □ ×  2240

POINT RANKING DISPLAY

RANKING DISPLAY OF ACQUIRED POINT IN PERIOD OF
DECEMBER 1, 2004 TO DECEMBER 31, 2004

| RANK | COMMODITY CODE | COMMODITY NAME | TOTAL POINT | PURCHASE NUMBER | NUMBER OF TIMES OF REFERENCE TO INVENTORY | NO INVENTORY |
|---|---|---|---|---|---|---|
| 1 | HG876-02-02 | DENIM JACKET, BLUE M | 97 | 8 | 10 | 1 |
| 2 | SF213-01-78 | DENIM PANTS, BLUE 78 | 72 | 4 | 9 | 5 |
| 3 | GH987-01-01 | LEATHER JACKET, BLACK S | 58 | 3 | 17 | 7 |
| 4 | SF213-01-74 | DENIM PANTS, BLUE 74 | 51 | 1 | 6 | 0 |
| 5 | ES902-03-02 | CHARACTER T SHIRT, WHITE M | 35 | 2 | 3 | 0 |

FIG. 20

| ACTION ID | COMMODITY TAG ID | MEMBER No. | ACTION | TIME | ANTENNA ID | SIMULTANEOUS READ COMMODITY TAG ID |
|---|---|---|---|---|---|---|
| 0021 | 3241BAE134325 | 1234-5678 | RACK (PICK UP) | 2004/12/15 13:14:29 | 01234 | |
| 0022 | 3241BAE134325 | 1234-5678 | REFERENCE TO INFORMATION TERMINAL | 2004/12/15 13:21:54 | 98765 | |
| 0023 | 3241BAE134325 | 1234-5678 | CARRYING INTO FITTING ROOM | 2004/12/15 13:23:27 | 56789 | ZYX123456789A |
| 0024 | 3241BAE134325 | 1234-5678 | (RETURN TO) RACK | 2004/12/15 13:29:20 | 01234 | |

FIG. 21

| PURCHASE ACTION No. | COMMODITY TAG ID | MEMBER No. | TOTAL POINT | PURCHASE | OCCURRENCE DATE | CORRESPONDING ACTION ID |
|---|---|---|---|---|---|---|
| 051 | 3241BAE134325 | 1234-5678 | 12 | × | 12/15 | 0021,0022,0023, 0024 |
| 055 | 3241BAE134325 | 4321-9876 | 16 | ○ | 12/27 | 0025,0026,0027 |
| 060 | 12343ABC98765 | 1357-2468 | 8 | × | 12/29 | 0028,0029 |

COMMODITY INFORMATION PROPOSAL SYSTEM

CLAIM OF PRIORITY

The present application claims priority from Japanese application JP2005-139869 filed on May 12, 2005, the content of which is hereby incorporated by reference into this application.

BACKGROUND OF THE INVENTION

1. Field of the Invention

This invention relates to a commodity information proposal system. More particularly, the invention relates to a sales analysis system, a marketing system and a commodity information proposal system for proposing commodity information to customers, each of which utilizes individual commodity identification information that in turn utilizes a non-contact IC tag such as RFID (Radio Frequency Identification) tag.

2. Description of the Related Art

Application of non-contact IC tags (hereinafter called "IC tags") to various fields has been expanded in recent years. The term "IC tag" means a tag that can read information of a memory inside a built-in IC chip and to write the information to an internal memory while kept out of contact from a reader/writer. JP-A-2004-246887 (Patent Document 1), for example, disclose sales management by using such IC tags. This prior art technology attaches an IC tag to a commodity, installs readers to shopping cages, entrance/exits, cash registers, and so forth, and reads the IC tags of the commodities by the readers to analyze sales and to conduct settlement processing and security management of commodities.

The prior art described in the Patent Document 1 mentioned above installs the readers as means for grasping purchase actions of customers to the shopping cages and reads the information of the commodities put into the shopping cages. Therefore, the shopping cage needs a power source such as a battery and the weight of the cage increases. This heavy cage weight becomes a large burden to the customers. In addition, a management work on the shop side becomes large, too, because the battery must be charged.

Read log information of the IC tags becomes enormous in shops having a large number of customers but the prior art described above does not execute a weighting processing for the read log information. Therefore, it is very difficult to extract, as marketing materials, valuable information as to which commodities are taken up by customers and as to which commodities are popular though the numbers of sales of the commodities are the same, as marketing materials. The prior art technology further involves the following problem. Shop managers want to promote purchase motivation of customers by proposing the information collected by reading the IC tags as the information of good selling commodities or popular commodities but the prior art cannot satisfy these requirements.

It is an object of the invention to provide a commodity information proposal system that solves the problems of the prior art described above, grasps purchase actions of customers inside shops from information collected by using IC tags attached to commodities, can propose information as a material for marketing about those commodities which are sold and those which are not sold, processes the collected information into a form in match with the intention of shop managers and proposes the information as information promoting purchase desires of customers to the customers.

SUMMARY OF THE INVENTION

The object of the invention described above can be accomplished by a commodity information proposal system comprising identifier read means installed at a plurality of positions inside a shop, for reading an identifier attached to each commodity inside the shop; a server for receiving a read result from the identifier read means, storing the read result and analyzing purchase actions of customers from the read result; and input/output means for output the purchase actions; the means and the server being connected to one another through a communication line; wherein the server analyses the behaviors of the customer as kinds of actions including pick-up of the commodity, returning of the commodity, carrying of the commodity into a fitting room, purchasing of the commodity and not purchasing the commodity from the read result of one or a plurality of said identifier read means; associates the behaviors of the customers with one another in accordance with the customers and the time as a series of purchase actions and totalizes the behavior in accordance with the kind of the behaviors contained in the purchase actions by taking a weight set in advance through the input/output means into consideration; and transmits the totalization result, the purchase actions or actions as the basis of totalization to the input/output means in accordance with a request from the input/output means.

According to the invention, it is possible to grasp the purchase actions of the customers inside the shop, to propose the information as the materials for marketing about those commodities which are sold and those which are not to shop managers, to process the collected information into the form the shop managers desire and to propose the information as information that may motivate the purchase desires of the customers.

BRIEF DESCRIPTION OF THE DRAWINGS

FIGS. 2A and 2B show a content of a commodity ID master.

FIG. 3 shows a content of a commodity trace DB.

FIG. 4 shows a content of a totalization DB.

FIG. 8 shows an example of an initial screen displayed on a management terminal.

FIG. 9 shows an example of a point ranking display screen displayed on the management terminal.

FIG. 10 shows an example of a commodity tag ID list screen displayed on the management terminal.

FIG. 11 shows an example of purchasing behavior list screen displayed on the management terminal.

FIG. 12 shows an example of an action list screen displayed on the management terminal.

FIG. 15 shows an example of an inventory information screen displayed on the information terminal.

FIG. 16 shows a construction of a commodity trace information table in a second embodiment.

FIG. 18 shows an example of a point ranking display screen.

FIG. 20 shows a structural example of a commodity trace information table stored in the commodity trace information DB in a third embodiment of the invention.

FIG. 21 shows a structural example of a purchase action table stored in a totalization DB in the third embodiment.

DESCRIPTION OF THE EMBODIMENTS

Commodity information proposal systems according to preferred embodiments of the invention will be hereinafter explained in detail with reference to the accompanying drawings. Incidentally, the term "commodity" used in the following description of the preferred embodiments represents apparels and accessories, for example, and it will be assumed that IC tags are attached to all commodities.

First Embodiment

Figure 1:
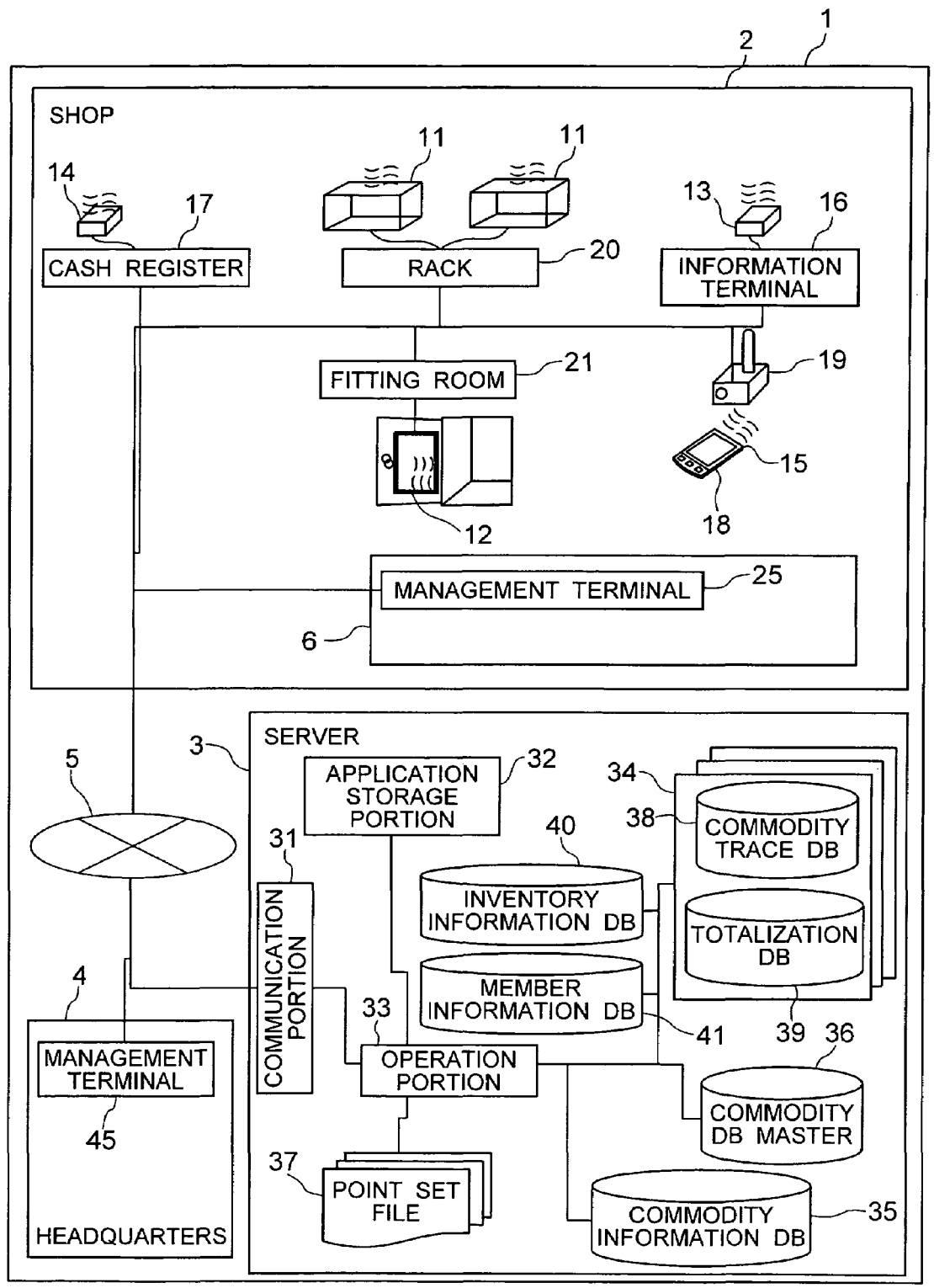
FIG. 1 is a block diagram showing an overall construction of a commodity information proposal system according to a first embodiment of the invention.

FIG. 1 is a block diagram showing an overall construction of a commodity information proposal system according to a first embodiment of the invention. In the drawing, reference numeral 1 denotes a commodity information proposal system. Reference numeral 2 denotes a shop and reference numeral 3 denotes an information proposal server. Reference numeral 4 denotes general headquarters and reference numeral 5 denotes a network. Reference numeral 6 denotes a staffroom and reference numeral 11 denotes a rack antenna. Reference numeral 12 denotes a fitting room antenna. Reference numeral 13 denotes an information terminal antenna. Reference numeral 14 denotes a cash register antenna. Reference numeral 15 denotes a PDA antenna. Reference numeral 16 denotes an information terminal and reference numeral 17 denotes a cash register terminal. Reference numeral 18 denotes a PDA and reference numeral 19 denotes a radio frequency LAN access point. Reference numeral 20 denotes a control terminal for rack and reference numeral 21 denotes an explanation terminal for fitting room. Reference numerals 25 and 45 denote management terminals. Reference numeral 31 denotes a communication portion and reference numeral 32 denotes an application storage portion. Reference numeral 33 denotes an operation portion and reference numeral 34 denotes a shop data management portion. Reference numeral 35 denotes a commodity information database (DB). Reference numeral 36 denotes a commodity ID master. Reference numeral 37 denotes a point set file. Reference numeral 38 denotes a commodity trace DB and reference numeral 39 denotes a totalization DB.

The commodity information proposal system 1 according to the first embodiment of the invention includes, inside the shop 2, a plurality of antennas for reading the IC tags attached to the commodities, the control terminals each having the antenna built therein or connected to the antenna, the server 3 for providing services of commodity information proposal, the management terminal 45 inside the headquarters 4 controlling the shops and the management terminals 25 for shops that are installed in the staffroom 6, etc, inside the shops so that the shop manager can utilize the later-appearing commodity information proposal service. These components are connected to one another by a network 5 such as the Internet. The antennas include the rack antenna 1, the fitting room antenna 12, the information terminal antenna 13 provided to the information terminal for customers, the cash register antenna 14 and the PDA antenna 15.

A unique ID for at least individual discrimination is written into a storage device inside an IC chip built in the IC tag attached to the commodity.

The rack antenna 11 is installed on a display rack in the shop, periodically reads the IC tags attached the commodities which are displayed on the rack and senses the existence/absence of the commodities on the rack. The fitting room antenna 12 is installed on the door or wall of the fitting room and reads the IC tags attached to the commodities that are taken into the fitting room by the customer.

The customer information terminal 16 is the one that is used by the customer for retrieving and looking up detailed information of the commodities, and operable by a touch panel, etc. The information terminal antenna 13 is connected to this terminal. When the customer brings the IC tag of the commodity close to the information terminal antenna 13, the detailed information of the commodity can be displayed on the screen of the information terminal 16.

The cash register antenna 14 is connected to the cash register terminal 17. When the customer pays for the commodity, a store clerk brings the IC tag of the commodity close to the cash register antenna 14 to execute sales registration of each commodity. The PDA antenna 15 is built in or connected to the PDA 18 carried by the store clerk in the shop. The PDA 18 is allocated to each store clerk for retrieving on the site the commodity information such as other sizes and other colors upon inquiry from customers, and is connected to the network 5 through the radio frequency LAN access point 19.

Each of the antennas described above is connected to the control terminal for controlling read and write of the information from and to the IC tag. The rack antenna 11 and the fitting room antenna 12 are connected to the control terminals 20 and 21, respectively. The information terminal 16 also serves as the control terminal for the information terminal antenna 13. Similarly, the cash register terminal 17 serves also as the control terminal for the cash register antenna 14 and the PDA 18 for the store clerk serves also as the control terminal for the PDA antenna 15. Each control terminal is connected to the information proposal server 3, etc, through the network 5. Each information terminal receives the unique ID of the IC tag read by each of the corresponding antennas, executes necessary data processing such as the addition of information and then transmits the information to the information proposal server 3. A plurality of rack antennas 11 exists in some cases inside the shop. In such cases, the control terminal 20 may be connected to each rack antenna 11 or a plurality of rack antennas 11 may be connected to one control terminal 20.

As already explained, the management terminal 25 for shop is installed in the staffroom 6, etc. inside the shop in order for the shop managers to utilize the commodity information proposal service. The information reference request received by the management terminal 25 from the shop manager is transmitted to the information proposal server 3 through WWW browser and the result that is transmitted in turn from the information proposal server 3 is displayed on the browser of the management terminal 25.

The management terminal 45 for headquarters is a terminal such as a PC for managers in charge typified by managers of marketing, logistics, supply chains, etc, of the headquarters 4 to utilize the commodity information proposal service and executes request/display of the information through the WWW browser in the same way as the management terminal 25 for shop managers. In the explanation to follow, the management terminal 25 for shop and the management terminal 45 for headquarters will be hereinafter called generically "management terminals 25 and 45".

The information proposal server 3 operates as a database server for storing commodity information inside the shop and a Web server for providing Web pages of the information proposal to the information terminal 16 and the management terminals 25 and 45. Owing to these functions, the information proposal server 3 proposes the commodity information proposal service inside the shop. The information proposal server 3 receives the read result of the IC tag transmitted from the control terminal, etc, described above, executes a necessary processing and registers the data as intra-shop commodity information to the database. The information proposal server 3 also accepts the information reference request from the management terminals 25 and 45 and from the information terminal 16, retrieves the corresponding information from the database, creates the Web page and transmits it to the management terminals 25 and 45 and the information terminal that makes the request. The information proposal server 3 includes the communication portion 31, the application storage portion 32, the calculation portion 33, the data management portion for each shop 34, the commodity information database (DB) 35, the commodity ID master 36 and the point set file 37. The same number of data management portions 34 for each shop as the number of the shops supervised by the headquarters 4 exists.

In the embodiment of the invention hereby explained, the information proposal server 3 is installed at a place independent of the shop 2 and the headquarters 4 but may be installed inside the shop 2 and the headquarters 4. The information proposal server 3 shown in FIG. 1 contains therein the inventory information DB 40 and the member information DB 41 and they will be explained later in the second and third embodiments of the invention.

In the description given above, the communication portion 31 is connected to the network 5, exchanges the information with other terminals, receives the information transmitted from other terminals, delivers it to the operation portion 33 and transmits the Web page generated by the operation portion 33 to the terminal requesting the information reference.

The application storage portion 32 is a hard disk for storing application software such as data processing executed by the operation portion 33, Web page generation, registration to the shop data management portion 34, and so forth. In the embodiment of the invention, the application storage portion 32 stores "trace information registration application (AP)" and "trace information reference AP". The detail of these AP and their processing will be explained later. The application storage portion 32 further stores those applications which utilize the information terminal 16 and the store clerk PDA 18 such as the commodity information proposal application at the information terminal 16.

The operation portion 33 loads the application software stored in the application storage portion 32 to the memory, executes data processing and Web page generation that use the data from the communication portion 31, the database of the shop data management portion 34, the commodity information DB 35 and the data registered to the commodity ID master 36 by using the parameters of the point set file 37 and registers the result to the database of the shop data management portion 34 or hands it over to the communication portion 31.

The commodity information DB 35 is the database that stores the detailed information of the commodity and holds a commodity name, a color, a size, a feature, a recommended combination, and so forth, for each commodity code. When a request for the commodity information arises from a customer through the information terminal 16, the commodity information of the commodity code requested by the customer is retrieved from the commodity information DB 35 and is displayed on the screen of the information terminal 16.

FIGS. 2A and 2B show the content of the commodity ID master 36. The commodity ID master 36 includes a commodity master table 361 shown in FIG. 2A and a tag ID master table 362 shown in FIG. 2B.

In the commodity master table 361 shown in FIG. 2A, one record stores one commodity code and has detailed information of the commodity as its attribute. Each record has a commodity code 3611 for identifying the commodity, a commodity name 3612, a kind 3613 representing the kind of the commodity, a price 3614, a size 3615 as an attribute 1 and a color 3616 as an attribute 2 in the case of apparel as shown in FIG. 2A. In the example shown in FIG. 2A, the commodity code is expressed by a code system of (model)—(color)—(size) but any other code system may be used to express the commodity code as long as it can identify the commodity.

In the tag ID master table 362 shown in FIG. 2B, one record stores a unique ID of one IC tag. One record holds as items a commodity tag ID 3621 for identifying the unique ID attached to the commodity (hereinafter referred to as "commodity tag ID") and a commodity code 3622 for identifying the commodity code of the commodity to which the IC tag is attached. It becomes thus possible to identify the commodity code of the commodity having the IC tag attached thereto from the unique ID of the IC tag read by each antenna with reference to the tag ID master table 362. The tag ID master table 362 registers the commodity tag ID 3621 and the commodity code 3622 in combination when the IC tag is generated or is attached to the commodity, for example.

The shop data management portion 34 manages the commodity information in each shop and includes a commodity trace DB 38 and a totalization DB 39.

FIG. 3 shows the content of the commodity trace DB 38. The commodity trace DB 38 is constituted by a commodity trace information table 381 as shown in FIG. 3.

The commodity trace information table 381 records the history of behavior of customers picking up the commodity inside the shop and one kind of action information is stored in one record. Here, the term "action" means the behaviors of the customer with respect to the commodity such as picking up of the commodity, taking of the commodity into the fitting room, bringing of the commodity close to the antenna, paying for the commodity, returning of the commodity to the rack, and so forth. These data are generated from the read result of the IC tag by each antenna.

Each record of the commodity trace information table 381 includes an action ID 3811 for identifying the action, a commodity tag ID 3812 for storing the unique ID of the IC tag for identifying the commodity as the object of the action, the action 3813 representing the action content, a time 3814 representing the day and hour at which the action takes place, an antenna ID 3815 for identifying the antenna that detects the IC tag and a simultaneous read commodity tag ID 3816 for identifying a unique ID when other IC tag read simultaneously at the same timing exists. When each antenna reads the IC tag, the data of these kinds of information are generated and registered by the respective control terminals or the information proposal servers 3.

FIG. 4 shows the content of the totalization DB 39. The totalization DB 39 has a purchase action table 391 as shown in FIG. 4.

The purchase action table 391 holds the information of a series of purchase actions of the customer and one record stores one purchase action. Here, the term "purchase action" means a series of actions of the customer from picking up of the commodity from the rack by the customer, return of the commodity back to the rack or paying for the commodity. For example, when the customer carries a certain commodity into the fitting room from the display rack and returns it again to the display rack, a series of actions is one purchase action. The record of the purchase action table 391 holds as items a purchase action No 3911 for identifying the purchase action, a commodity tag ID 3912 for identifying the commodity as the object of the purchase action, a total point 3913 representing the later-appearing point of the purchase action, a purchase 3914 representing whether or not the commodity is purchased as a result of the purchase action, an occurrence date 3915 representing the data of the occurrence of the purchase action and a corresponding action ID 3916 for identifying the action ID of the commodity trace information table 381 corresponding to the purchase action.

Figure 5:
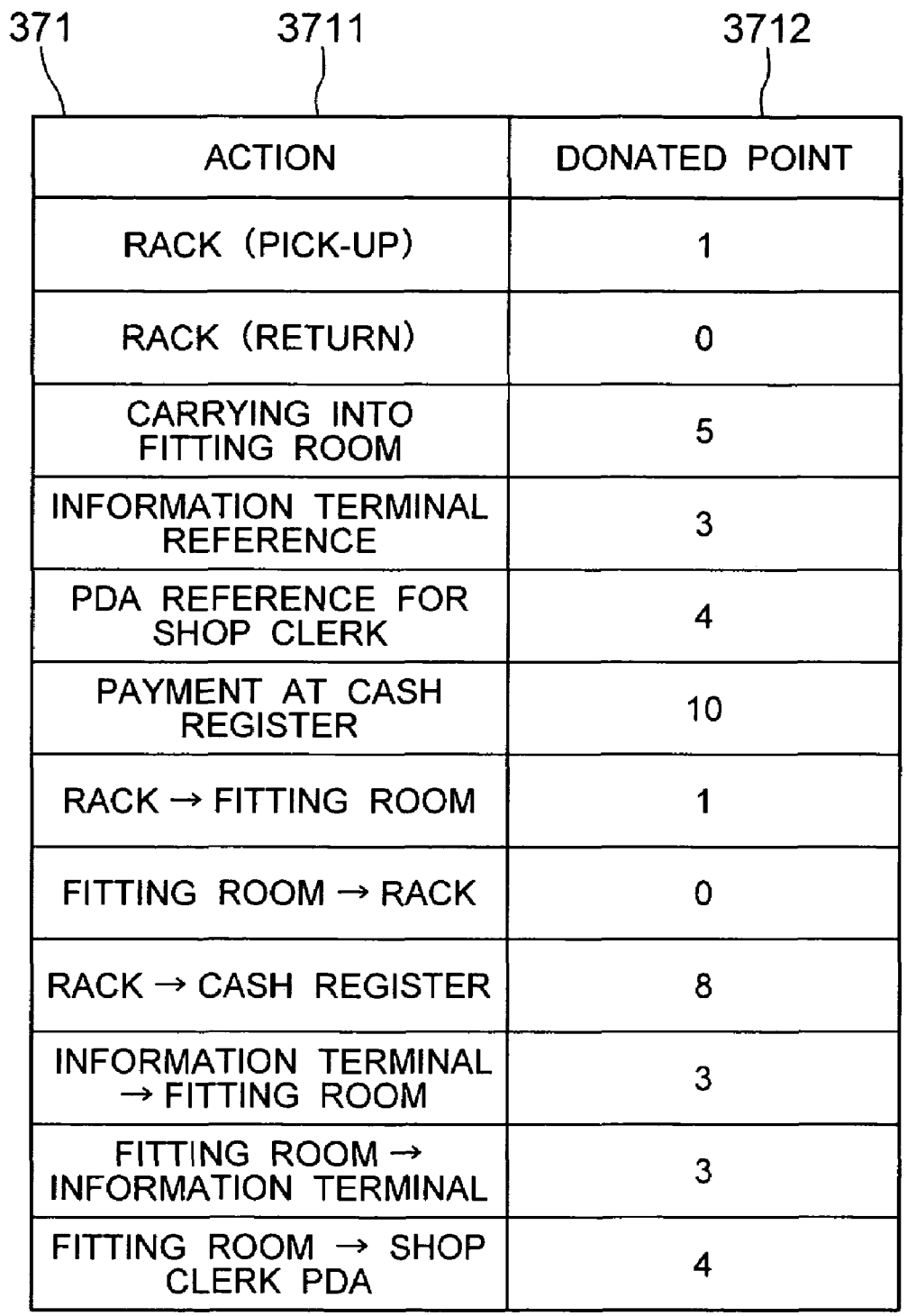
FIG. 5 shows a content of a point set file.

FIG. 5 shows the content of the point set file 37. The point set file 37 is a set file for calculating the point of the action occurring. The example shown in FIG. 5 represents a structural example of the point set table 371 expressing the content of the point set file 37 in the table form.

The point set table holds as items an action 3711 representing the content of the action and a given point 3712 that sets the point number to be given to the purchase action when the action occurs. The given point number is set by the managers at the shop and headquarters from the management terminals 25 and 45 as the point set file 37. In the example shown in FIG. 5, the total point given to the purchase action that is merely to pick up the commodity from the display rack is 1 and the action that carries the commodity into the fitting room and again returns it to the display rack is 1+1+5+0=7. In the example shown in FIG. 5, not only the action based on the IC tag read result but also the routes among the actions are the object of point donation but only the action based on the IC tag read result may be handled as the object of point donation.

Processing of First Embodiment

Next, the operation of the commodity information proposal system 1 according to the first embodiment of the invention will be explained. The commodity information proposal system 1 in this embodiment executes the processing by using the trace information registration AP and the trace information reference AP stored in the application storage portion 32 of the information proposal server 3 and each control terminal. First, the explanation will be given on the processing of the trace information registration AP and each control terminal when the antenna reads the IC tag of the commodity.

Figure 6:
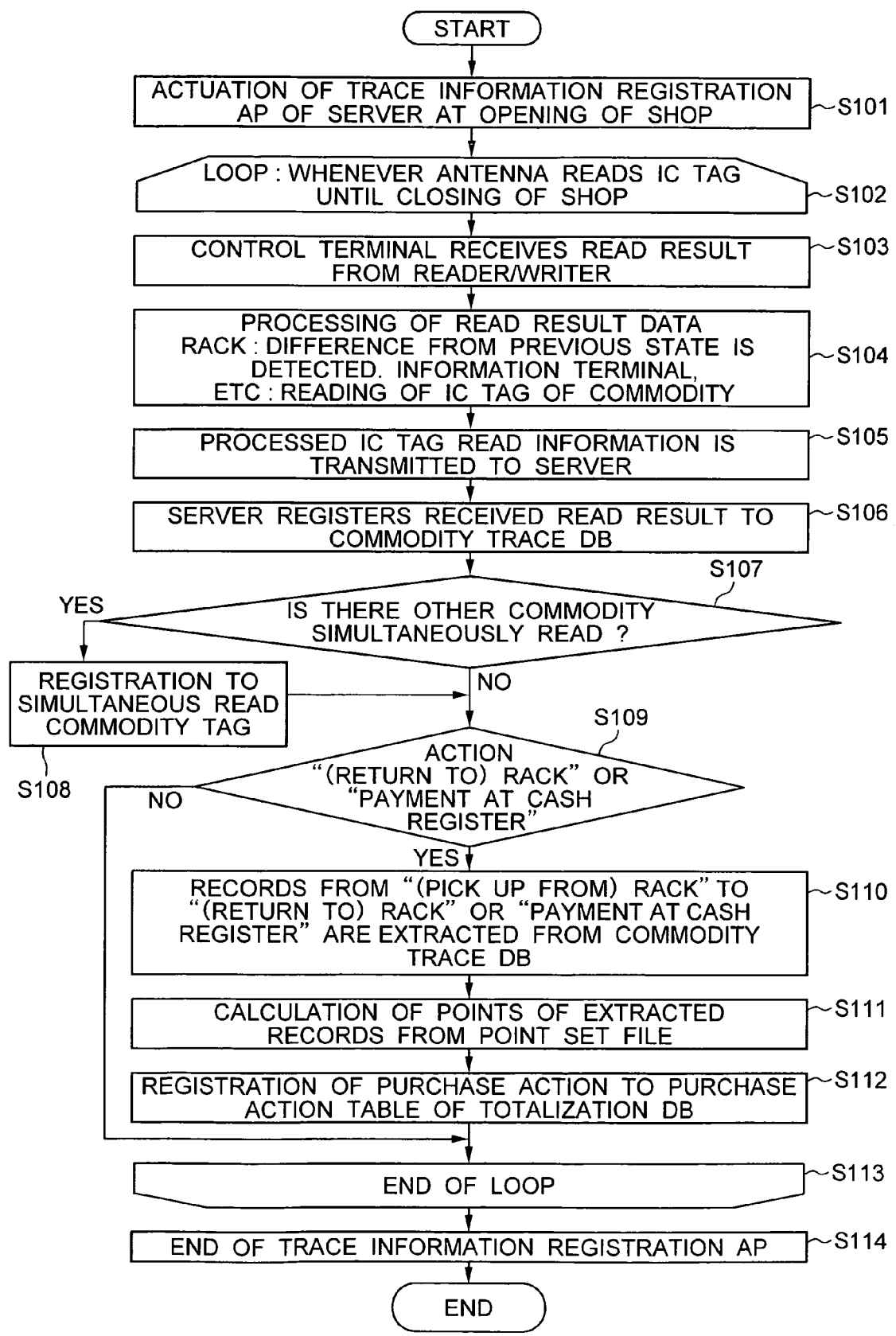
FIG. 6 is a flowchart useful for explaining a processing operation that registers information as a read result of an IC tag to each DB of an information proposal server.

FIG. 6 is a flowchart for explaining the processing until the information of the read result of the IC tag is registered to each DB of the information proposal server 3 and the explanation will be given on this point.

(1) To begin with, the trace information registration AP stored in the application storage portion 32 of the information proposal server 3 is actuated when the shop is open. Consequently, the operation portion 33 can execute the processing of the trace information registration AP when the read data of the IC tag is handed over from each control terminal (Step S101).

(2) Setting is made so that whenever the antenna reads the IC tag of the commodity, the processing from Step S103 to Step S112 is repeated until the shop is closed (Steps S102 and S113).

(3) First, the unique ID of the IC tag read by the antenna is transmitted to each control terminal through a reader/writer. In the case of the rack antenna 11, the radio wave is periodically outputted and the commodity tag ID of all the commodities on the display rack is read. The frequency of outputting the radio wave is controlled by the set file of the control terminal 20. In the case of the fitting room antenna 12, the information terminal antenna 13 and the cash register antenna 14, the commodity tag ID is read whenever the customer or the shop clerk brings the IC tag of each commodity close to the antenna (Step S103).

(4) The control terminal processes the read result of the commodity tag ID received and transmits it to the information proposal server 3. Transmission of data between the control terminal and the information proposal server 3 is executed by a CSV file interface, etc (Steps S104 and S105).

The method for processing the IC tag read result in the processing of Step S104 will be hereby explained. First, the explanation will be given on the control terminal 20 connected to the rack antenna 11.

The rack antenna 11 periodically reads the commodity tag ID on the display rack. However, only those commodity tag ID which exhibit the state change are transmitted without transmitting all the read results to the information proposal server 3. In other words, the control terminal 20 compares the commodity tag ID read at the time T=N with the commodity tag ID read at the time T=N−1, detects the difference between the commodity tag ID that increases afresh and the commodity tag ID that disappears at T=N, and transmits this difference to the information proposal server 3. It becomes thus possible to detect the commodities that are once picked up by customers and the commodities that are returned to the rack. The control terminal 20 of the rack antenna 11 detects the commodity tag ID of the commodity exhibiting the state change by the method described above, attaches the antenna ID of the rack antenna 11 at which the difference occurs and the information of the time and the action to the respective commodity tag ID and sends them to the server 3. The action is defined in advance for each control terminal 20 by the set file with the antenna ID such as "when commodity tag ID increases→ (return to) rack", "when the commodity tag ID disappears→ (pick up from) rack", and so forth.

Next, the case of each control terminal connected to the fitting room antenna 12, the information terminal antenna 13, the cash register antenna 14 and the PDA antenna 15 will be explained. These antennas read the commodity tag ID when the customer or the shop clerk brings the IC tag of the commodity close to the antenna. Whereas the control terminal 20 of the rack antenna 11 transmits the information to the information proposal server 3 when the difference occurs between the previous read result and the present read result, the control terminal connected to the fitting room antenna 12, etc, transmits the information to the information proposal server 3 when it reads the IC tag. In this instance, these control terminals execute the processing for attaching the antenna ID, the read date and hour and the information of each action to the commodity tag ID. The content of the action is held by each control terminal in the set file and each control terminal attaches the information by referring to the set file. Owing to this processing, the read information of the commodity tag ID is processed into the CSV file having the attribute items other than the action ID of the record exactly explained with reference to FIG. 3.

(5) When the file of the IC tag read result data processed by the processing of Step S104 is sent from each control terminal to the communication portion 31 of the information proposal server 3 through the network 5, the communication portion 31 of the information proposal server 3 receives the file from each control terminal and hands it over to the operation portion 33. Receiving the file, the operation portion 33 generates the action ID for each record received in accordance with the trace information registration AP actuated and registers it to the commodity trace information table 381 of the commodity trace DB 38. The operation portion 33 registers the action ID to the action ID 3811 in the commodity trace information table 381, the commodity tag ID in the file received to the commodity tag ID 3812, the action content in the file received to the action 3813, the IC tag read time received to the time 3814, the antenna ID reading the IC tag in the file received to the antenna ID 3815, respectively (Step S106).

(6) Whether or not a plurality of commodity tag ID exists at the same time and at the same antenna ID such as the fitting room antenna 12 and the cash register antenna 14 is judged, and when the commodity tag ID read at the same time exists, the commodity tag ID of the commodity read simultaneously is registered to the simultaneous read commodity tag ID 3816 (Steps S107 and S108).

(7) When the commodity tag ID simultaneously read does not exist as a result of the judgment of Step S107 or after the processing of Step S108 is complete, whether or not the action 3813 of the record registered to the commodity-trace information table 381 is "(return to) rack" or "payment at cash register" is judged. When the action 3813 is not "(return to) rack" or "payment (at cash register)", the flow returns to the processing from Step S103 and the processing is repeated (Step S109).

(8) When the action 3813 is "(return to) rack" or "payment at cash register" as a result of judgment of Step S109, the operation portion 33 of the information proposal server 3 retrieves and extracts all the records from the record immediately before the action "(pick up from) rack" to the action "(return to) rack" or the action "payment at cash register" each having the same record as the commodity tag ID 3812 of the corresponding record from the commodity trace information table 381 of the commodity trace DB 38. Owing to this processing, the record of the customer who conducts "(return to) rack" or "payment at cash register" picks up the commodity from the display rack and again returns it to the rack or pays for the commodity at the cash register, that is, the purchase action of the customer, can be extracted (Step S110).

(9) Next, the total point of the purchase behavior is calculated by referring to the point set file 37 on the basis of the record extracted by the processing of Step S110. This processing retrieves the corresponding action 3711 from the point set file 37 with the content of the action of each record as the key, extracts the point given to each action from the donation point 3712, calculates the sequence of the occurrence of the actions from the occurrence time of the action received from each control terminal, and gives the point to the route of the purchase action such as rack→fitting room, too, extracts the donation points of the actions, and gathers these points to calculate the total point (Step S111).

(10) After calculation of the total point of the purchase behavior is completed, the purchase action No. 3911 is generated afresh and the commodity tag ID 3912, the total point 3913 calculated and the corresponding action ID 3916 are registered to the purchase action table 391 of the totalization DB 39. When the judgment result of the action 3813 judged in Step S109 is "payment at cash register" at this time, "Yes" is registered to "purchase" 3914. When the action is "(return to) rack", "No" is registered (Step S112) to "purchase" 3914.

(11) The processing of Steps S103 to S112 described above is executed whenever the antenna reads the IC tag while the shop is open. After the shop is closed, the trace information registration AP is completed and the processing is finished (Step S114).

The processing explained above is the processing of the trace information registration AP and each control terminal when the antenna reads the IC tag of the commodity.

It is assumed in the example given above that each control terminal executes the processing for processing the IC tag read result into the record having the attribute information such as the action and the date and hour, and the information proposal server 3 receives the record and registers it to each database. However, it is possible to employ the construction in which only the unique ID of the IC tag read by each control terminal is transmitted to the information proposal server 3 and this information proposal server 3 executes all of the processing for processing the data into the file of the commodity IC tag read result. In other words, the processing of Step S104 for adding the action content and the action occurrence date, etc is executed by the information proposal server 3 in this case.

In the example given above, the explanation has been made on the assumption that the data is processed or is registered on the real time basis to the information proposal server 3 whenever each antenna reads the IC tag. In the invention, however, the processing of the read result by each control terminal may be made on the real time basis and transmission to the information proposal server 3 and registration to the database may be made on the day basis.

When the processing having the flow described above is executed, it becomes possible to read the purchase actions of the customers such as picking up of the commodity from the display rack, carrying of the commodity into the fitting room and reference to the commodity information by using the information terminal, by reading the IC tag attached to the commodity by each antenna and to trace the content by registering the actual record to the database. The point is given to the purchase action whenever the IC tag is read with each antenna being the check point. In this way, it is also possible how much interest the customer taking the purchase action shows in the commodity when the database is looked up.

Next, the operation of the trace information reference AP in the case where the managers at the shop 2 and headquarters 4 look up the commodity trace information registered to the processing of the flow shown in FIG. 6 will be explained.

Figure 7A:
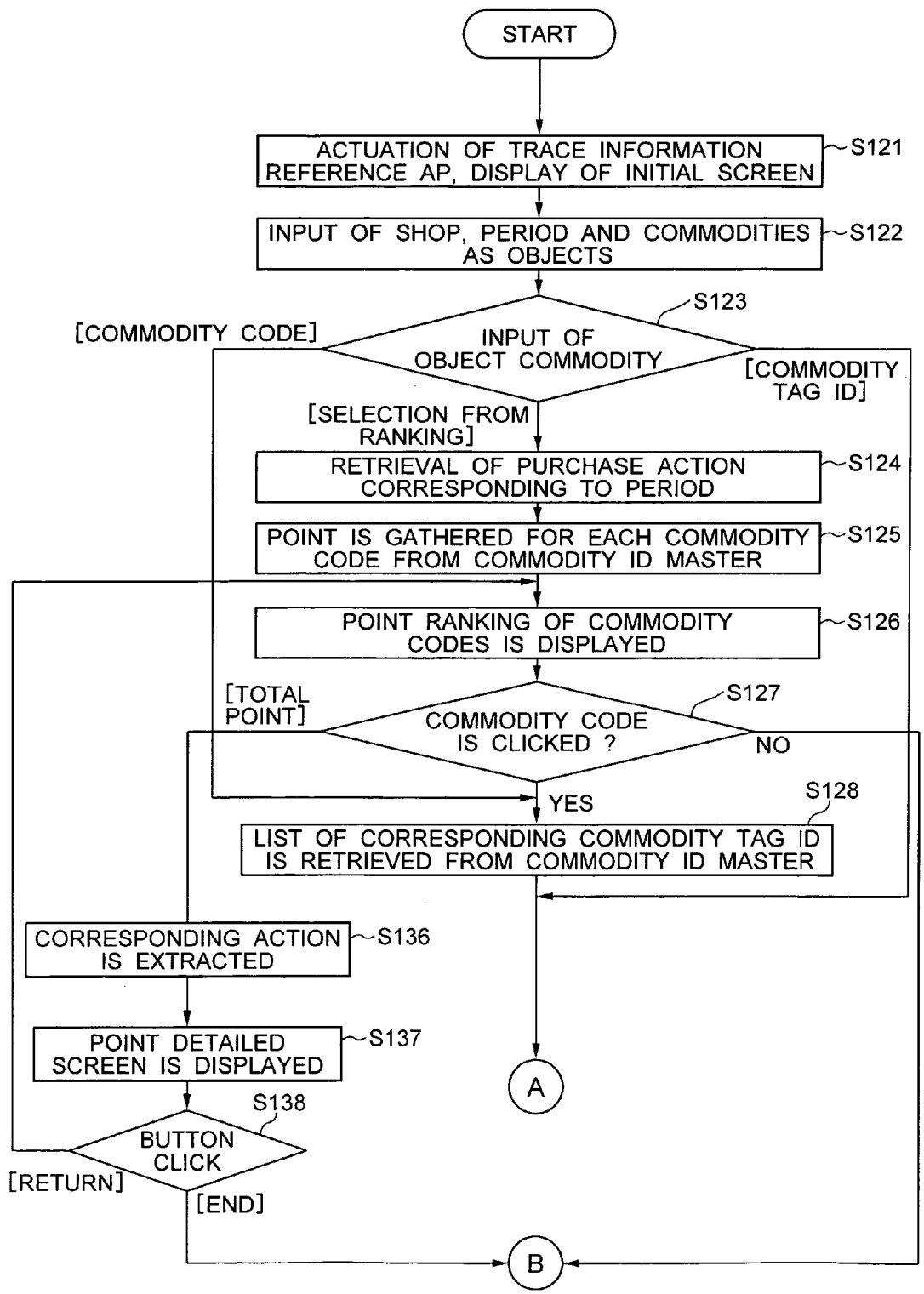
FIG. 7A is a flowchart (No. 1) useful for explaining a processing operation of a trace information reference AP.
Figure 7B:
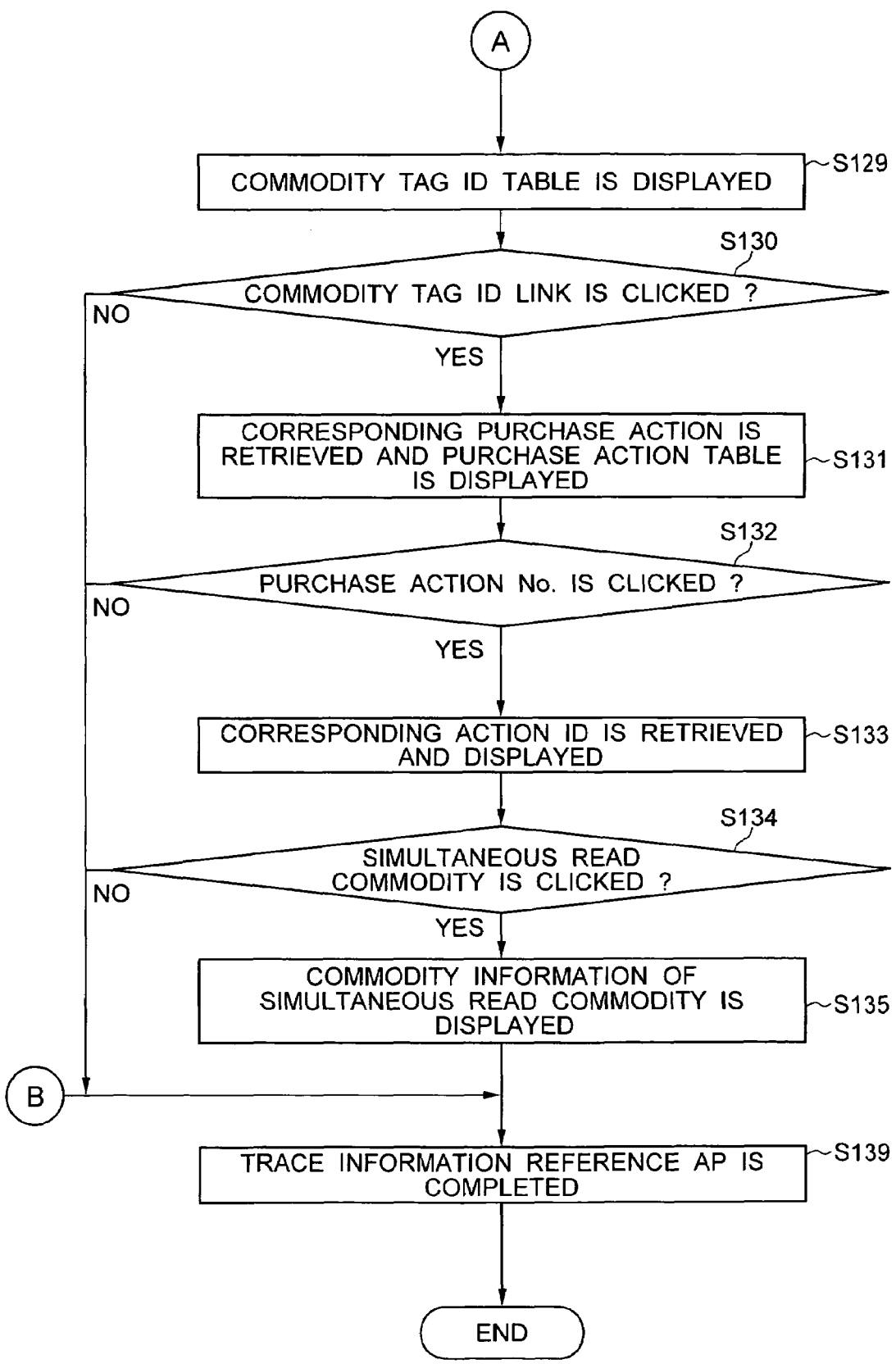
FIG. 7B is a flowchart (No. 2) useful for explaining the processing operation of the trace information reference AP.

FIGS. 7A and 7B are flowcharts useful for explaining the processing operation of the trace information reference AP and FIGS. 8 to 13 show the examples of the screens displayed in the flow in FIGS. 7A and 7B. The explanation will be given with reference to these drawings.

(1) First, the user calls the trace information reference AP stored in the application storage portion 32 inside the information proposal server 3 from the management terminals 25 and 45 by using the operation portion 33 and actuates the trace information reference AP (Step S121).

(2) When the trace information reference AP is actuated, the initial screen 1210 shown in FIG. 8 is displayed on the management terminals 25 and 45. The user selects the shop name as the object from a shop selection pull-down 1211. When an access from the management terminal 25 for shop exists, the shop 2 in which the management terminal 25 is installed is set as the initial value to the shop pull-down 1211. The period as the object is inputted to a period input column 1212. A commodity code or commodity tag ID is inputted for the commodity as the object or the commodity is selected from ranking for each of the later-appearing commodity codes. In the case of the commodity code, it is inputted to a commodity code input column 1213. In the case of the commodity tag ID, it is inputted to a commodity tag ID input column 1214. When the commodity is selected from the ranking, a check box 1215 is turned ON. After the shop, the period and the commodity are inputted, a retrieval button 1216 is clicked (Step S122).

(3) In the processing of Step S122, whether the input of the object commodity is made by "commodity code" or "selection from ranking" or "commodity tag ID" is judged (Step S123).

(4) When the input of the object commodity is made by "selection from ranking" in the judgment of Step S123 and the ranking selection check box 1215 is turned ON, the information proposal server 3 extracts the record corresponding to the object period from the purchase action table 391 of the totalization DB 39 by looking up the occurrence date 3915 of each record (Step S124).

(5) Next, calculation of the total point and totalization of the purchase number are made for each commodity code 3622 retrieved with the commodity tag ID 3621 as the key for the record extracted by the processing of Step S124 by referring to the tag ID master table 362 of the commodity ID master 36 (Step S125).

(6) After calculation of the total point and totalization of the purchase number for each commodity code are completed by the processing of Step S125, the commodity codes having higher total points are sorted and a point ranking list is generated and displayed on the management terminals 25 and 45. FIG. 9 shows a point ranking display screen 1260 at this time. As shown in FIG. 9, the ranking list 1261 displays a total point rank 1262, a commodity code 1263, a commodity name 1264 of the commodity master table, a total point 1265 and a purchase number 1266. Here, ranking is made by the total point but ranking may also be made in accordance with the purchase number (Step S126).

(7) The commodity code 1263 and the total point 1265 shown in FIG. 9 are linked with each other. The commodity code 1263 is clicked when it is desired to refer to the purchase action in the commodity tag ID level, and the total point 1265 is clicked to refer to the point detail in the commodity code unit. Whether the user clicks the commodity code 1263 or the total point 1265 or does nothing is hereby judged (Step S127)

(8) When the commodity code is judged as being inputted by the judgment of Step S123 or when the commodity code 1263 is judged as being clicked by the judgment of Step S127, the information proposal server 3 retrieves and extracts the commodity tag ID corresponding to the inputted commodity code from the ID master table 362 of the commodity tag ID master 36 (Step S128).

(9) Next, the total point of the commodity tag ID retrieved and extracted by the processing of Step S128 or the commodity tag ID inputted by the processing of Step S122 during the object period is displayed as a list on the management terminals 25 and 34 in the following way (step S129).

First, the corresponding record in the object period is extracted from the purchase action table 391 of the totalization DB 39 with the commodity tag ID as the key. When the records exist, whether or not the commodity has been sold already is judged by the purchase 3914 from the record exists. When the commodity has been sold, the occurrence date 3915 is set to the purchase date. When it is not, the occurrence date 3915 of the latest purchase action record is extracted. Furthermore, the total point 3913 of each record is extracted. When a plurality of records exists, the total point 3913 is gathered for each commodity tag ID. The record extraction and gathering processing described above are executed for all of the corresponding commodity tag ID and a commodity tag ID table is generated and displayed.

FIG. 10 shows an example of the commodity tag ID table screen 1290 displayed on the management terminals 25 and 45 by the processing of this Step S129. When the commodity code is inputted by the processing of Step S122 in FIG. 10, the corresponding commodity tag ID is displayed as one record on the commodity tag ID table 1291. When the commodity tag ID is inputted by the processing of Step S122, one of the records is displayed on the commodity tag ID table 1291. The retrieval result and the commodity tag ID inputted are displayed on the commodity tag ID 1292 of the commodity tag ID table 129 and the status of the commodity of the commodity tag ID is displayed on the present status 1293. Those commodities which have already been sold are regarded as "sold" and those remaining in the shop, as "not sold". The latest purchase action occurrence date 1294 represents the date of the latest purchase action occurred. The sale date 1295 represents the date on which the commodity tag ID having the present status of "sold" is sold. The total point 1296 gathers the total point of the record during the object period. As described above, the link is set between the commodity tag ID 1292 and the total point 1296 when the record within the object period exists in the purchase action table 391. The total point 1290 of the commodity tag ID not having the record within the object period on the purchase action table 391 is set to 0 and no link is set to the commodity tag ID 1292. The above is the processing of Step S129.

(10) When the user looks up the commodity tag ID screen 1290 shown in FIG. 10 and further the information of the purchase action of the customer, the link of the commodity tag ID 1292 is clicked. Therefore, whether or not the link of the commodity tag ID 1292 is clicked is judged (Step S130).

(11) When the link of the commodity tag ID 1292 is judged as clicked in Step S130, the information proposal server 3 displays in the list form the records of the corresponding purchase action in the purchase action table 391 extracted in the processing of Step S129 on the management terminals 25 and 45.

FIG. 11 shows an example of the purchase action table screen 1310 displayed at this time on the management terminals 25 and 45. In FIG. 11, the purchase action corresponding to the commodity tag ID acquired from the purchase action table 391 as a result of retrieval is displayed on the purchase action table 1311. The purchase action No. 1312, the total point 1313, the purchase 1314 and the occurrence date 1315 of the purchase action table 1311 are coincident with the purchase action No. 3911, the total point 3913, the purchase 3914 and the occurrence date 3915 of the purchase action table 391, respectively. Here, a link is set to the purchase action No. 3911 of the purchase action table 391 and when this is clicked, the screen shifts to the display screen on which the detail of the later-appearing purchase action can be looked up (Step S131).

(12) The user looks at the purchase action table screen 1310 shown in FIG. 11 and clicks the link of the purchase action No. 1312 when any purchase action the detail of which is desired to be studied exists. Therefore, whether or not the link of the purchase action No. 1312 is clicked is judged (Step S132).

(13) When the link of the purchase action No. 312 is judged as being clicked in Step S132, the information proposal server 3 looks up the action ID corresponding to the purchase action No. 1312 from the corresponding action ID 3916 of the purchase action table 391 and retrieves the corresponding action from the commodity trace information table 381 of the commodity trace DB 38 by using the action ID as the key. After all the corresponding actions are retrieved, the retrieval result is displayed on the management terminals 25 and 45.

FIG. 12 shows an example of the action table screen 1330 displayed on the management terminals 25 and 45 at this time. In FIG. 12, the action table 1331 in the screen includes an action 1332, a read time 1333 at which the antenna detects the IC tag, an antenna ID 1334 of the antenna reading the IC tag, an acquisition point 1335 representing the point donated by each action acquired on the basis of the point set file 37 and a simultaneous read commodity 1336 representing the commodity that is simultaneously read, if any. All of the action 1332, the read time 1333, the antenna ID 1334 and the simultaneous read commodity 1336 are acquired from the commodity trace information table 381. The donation point 3712 is acquired from the point set file 37 with the action 1332 as the key and the acquisition point 1335 is calculated and displayed. When the simultaneous read commodity 1336 exists, the link for shifting to the screen for displaying the commodity information is set to the commodity tag ID displayed on the commodity 1336 (Step S133).

(14) To look up the action table screen 1330 and to refer to the information about the simultaneous read commodity, the user clicks the link of the simultaneous read commodity 1336. Therefore, whether or not the link of the simultaneous read commodity 1336 is clicked is judged (Step S134).

(15) When the link of the simultaneous read commodity 1336 is judged as being clicked in Step S134, the commodity code corresponding to the commodity tag ID clicked is retrieved from the commodity ID master 36 and the commodity information is acquired from the resulting commodity code from the commodity information DB 35 and displays it on the screen (Step S135).

(16) When the link of the total point 1265 is judged as being clicked in Step S127 described above, the information proposal server 3 retrieves the commodity tag ID corresponding to the commodity code 1263 of the record clicked from the commodity ID master 36 and extracts the corresponding record during the object period from the purchase action table 391 of the totalization DB 39 with the commodity tag ID being the key. The record of the corresponding commodity trace information table 381 is extracted with the corresponding action ID 3916 being the key. Such a processing is executed the number of times equal to the number of the corresponding commodity tag ID and the action corresponding to the commodity code 1263 is extracted from the commodity trace information table 381 (Step S136).

(17) After the corresponding action is extracted by the processing of Step S136, the action contents registered to the action 3813 of the records are counted respectively. After the action contents of all the records are totalized, the point detail table is generated and is displayed on the management terminals 25 and 45.

Figure 13:
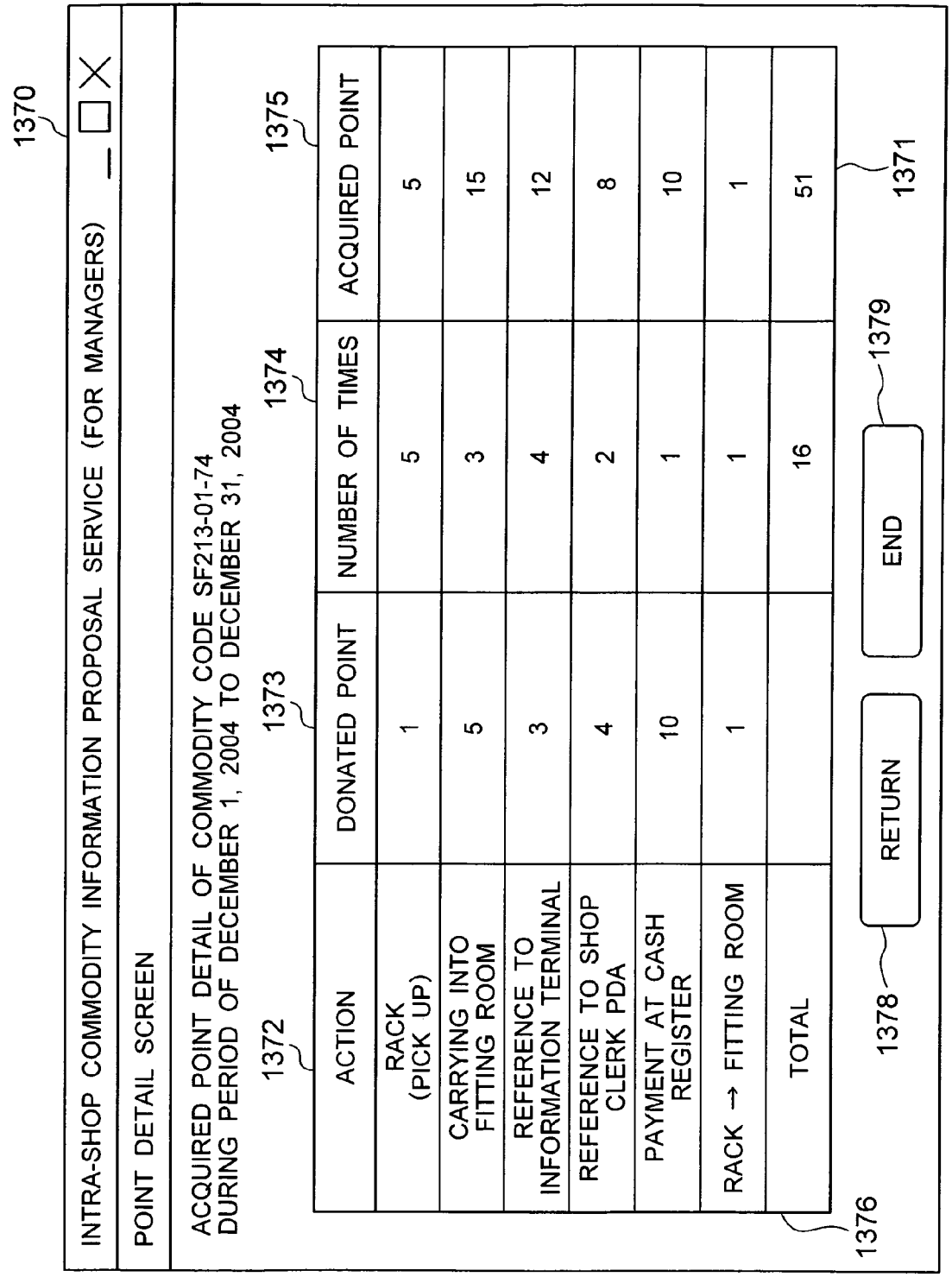
FIG. 13 shows an example of a point detail screen displayed on the management terminal.

FIG. 13 shows an example of the point detail screen 1370 displayed at this time on the management terminals 25 and 45. The point detail table 1371 in the screen shown in FIG. 13 displays the number of times of actions of all the commodities inside the commodity code and the acquired point for the content of each action. Namely, an action 1372, a given point 1373, a number of times 1374 and an acquired point 1375 are displayed. The action 1372 represents the actions 3813 of all the corresponding records of the commodity trace information table 381. The given point 1373 is acquired from the point set file 37 with the action 3813 being the key. The number of times 1374 represents the gathering result described above. The acquired point 1375 is the product of multiplication of the given point 1373 and the number of times 1374. The lowermost row 1376 of the point detail table 1371 represents the total, and the total of the number of times 1374 and the total of the acquired point 1375 are displayed (Step S137).

(18) When the user returns to the point ranking display screen 1260 of Step S126 after looking up the point detail table 1371 shown in FIG. 13, the user clicks a "return" button 1378 in the point detail screen 1370 and also clicks "end" button 1379 to complete the processing of the trace information reference AP. Therefore, which of the buttons is clicked is judged (Step S138).

(19) The trace information reference AP is completed when the link is not clicked in Steps S127, S130, S132 and S134 ("NO"), when the simultaneous read commodity information is looked up in Step S135 and when the "end" button 1379 is clicked in Step S138, and the processing is completed (Step S139).

The above explains the flow of the processing of the trace information reference AP when the information reference request exists from the management terminals 25 and 45.

In the flow described above, the commodity information of the simultaneous read commodity is displayed in the processing of Step S135 but the purchase action table screen 1310 of the simultaneous read commodity may be displayed, too. In the embodiment of the invention described above, the purchase 3914 is set into the purchase action table 391 of the totalization DB 39 and is registered depending on Yes or No in order to record to the database whether or not the customer purchases the commodity as a result of the purchase action. However, it is also possible to set the item "final point" into the purchase action table 391 and to register by the antenna ID to which the commodity is finally put. When the final point is the antenna ID of the cash register antenna 14, it is possible to judge that the commodity is purchased. When it is the antenna ID of the rack antenna 11, it is possible to judge that the commodity is left as such without being purchased.

According to FIGS. 7A and 7B in the first embodiment of the invention described above, it is possible for the managers of the shop and the headquarters to grasp those commodities which draw the interest of the customers such as carrying-in of the commodity into the fitting room and inquiry for the store clerk though the commodities are not sold. It is also possible to acquire the information as the basis of the detailed analysis of the purchase actions of the customers i.e. which and which commodities are carried into the fitting room and which of them are purchased, and what is the decisive factor for the purchase.

Second Embodiment

In addition to the commodity information provided by the first embodiment of the invention described above, the second embodiment makes it possible to offer the inventory information of each commodity and the purchase action information of customers to the managers of the shop and the headquarters by establishing the link with the inventory information of the shop. Incidentally, the explanation of the construction that is common to that of the first embodiment will be omitted in the second embodiment that will be explained next.

The commodity information proposal system inside the shop according to the second embodiment of the invention is different from the first embodiment only in that an inventory information DB 40 is provided and that the application storage portion 32 of the information proposal server 3 stores "inventory information proposal AP" in addition to the AP explained in the first embodiment. It will be assumed hereby that the inventory information DB 40 stores the stock number for each commodity code, holds the total stock number of the shop 2, collects the inventory number for each commodity code by the inventory management system whenever in-and-out of commodities such as arrival of the commodities, transfer/return/sale of the commodities to a commodity center and other shops, movement of the commodities from a shop warehouse to the counter, etc, occurs, and stores the inventory number inside the shop 2 on the real time basis.

In the second embodiment, the information terminal 16 displays not only the commodity information of the commodity brought close to the information terminal antenna 13 by the customer but also the inventory information of commodities having different sizes and different colors. Similar inventory information can be looked up from the PDA 18 for the shop clerk, too.

Figure 14:
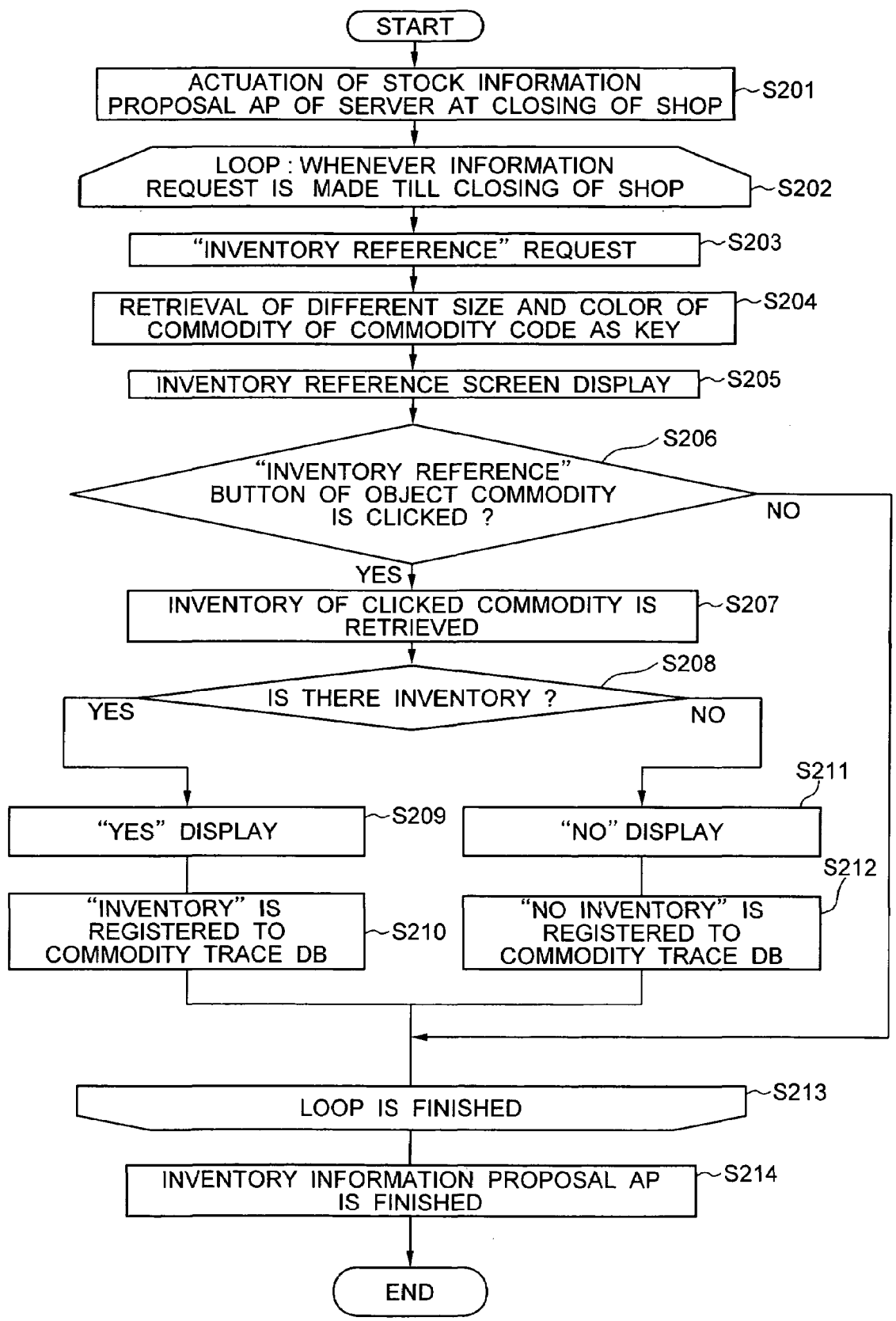
FIG. 14 is a flowchart useful for explaining a processing operation of an inventory information proposal AP when a customer makes inventory reference from an information terminal.

FIG. 14 is a flowchart for explaining the processing operation of the inventory information proposal AP when the customer looks up the inventory from the information terminal 16. Next, this flowchart will be explained.

(1) First, the inventory proposal information AP stored in the application storage portion 32 of the information proposal server 3 is actuated at the time of opening of the shop. Consequently, the processing in the inventory information proposal AP is executed when the inventory information reference request is handed over from the information terminal 16 to the calculation portion 33 (Step S201).

(2) Setting is made so that the processing from Step S203 to Step S212 is repeated whenever the reference request of the inventory information is made by the customer till closing of the shop (Steps S202 and S213).

(3) When the customer indicates the "inventory reference" request after the customer brings the IC tag of the commodity close to the information terminal antenna 13 and looks up the commodity information, the inventory information proposal AP is called (Step S203).

(4) The information proposal server 3 receives the inventory reference request from the information terminal 16, retrieves the commodity code from the commodity ID master 36 with the commodity tag ID read by the information terminal antenna 13 as the key, and further retrieves the commodities having the same model number but having difference sizes and different colors from the commodity master table 361 (Step S204).

(5) Next, the inventory information screen is generated on the basis of the retrieval result in Step S204 and is displayed on the information terminal 16. FIG. 15 shows an example of the inventory information screen 2050 displayed on the information terminal 16. The inventory reference object commodity table 2051 inside the inventory information screen 205 shown in FIG. 15 expresses in the matrix form the commodities having the same model number but different sizes and different colors and retrieved by the processing of Step S204. An "inventory status" button 2052 is arranged at each matrix. When one of the buttons is clicked, the existence/absence of the inventory of the commodity having the corresponding size and color is displayed on a result display box 2055 (Step S205).

(6) Whether or not the "inventory status" button 2052 is clicked is judged because the customer clicks this button to know the inventory (Step S206).

(7) When one of the "inventory status" buttons 2052 is judged as being clicked in Step S206, the information proposal server 3 confirms the inventory of the commodity clicked by retrieving the inventory information DB 40 and whether or not the inventory of the designated commodity exists is judged (Steps S207 and S208).

(8) When the inventory is judged as existing in Step S208, the size of the corresponding commodity and its color corresponding to the button clicked by the user in Step S206 are displayed on the size display box 2053 and the color display box 2054 and the text reading "yes, it is available" is displayed on the result display box 2055 (Step S209).

(9) An inventory reference actual record is registered to the commodity trace information table 382 of the commodity trace DB 38. Here, the commodity trace information table 382 in the second embodiment of the invention will be explained. FIG. 16 shows the construction of the commodity trace information table 382 in the second embodiment of the invention. When the inventory inquiry is made, the commodity code as the retrieval object is registered with mark "#" at the start for distinguishing this code from the commodity tag ID to the commodity tag ID 3821. The inventory status 3822 as an item representing the inventory status at that time is added. "Yes" is registered when the inventory is available when the inventory inquiry is made and "No", when the inventory does not exist. Since the inventory exists in this processing, "Yes" is registered as represented by the record 3825 shown in FIG. 16 (Step S210).

(10) When the inventory is not judged as existing in Step S208, the size and the color of the commodity corresponding to the button clicked by the user in Step S206 are displayed on the size display box 2053 and the color display box 2054 and furthermore, the text "it is not available" on the result display box 2055 (Step S211).

(11) The stock reference actual record is registered to the commodity trace information table 382 of the commodity trace DB 38 in the same way as when "inventory exists". In this case, "#" mark is put to the start of the commodity code for which inventory inquiry is made in the same way as the record 3826 shown in FIG. 16 and "No" is registered with the information of the date, etc, to the inventory status 3822 (Step S212).

(12) The processing of Steps S203 to S212 described above is repeated while the shop is open whenever the inventory information inquiry is made by the customer and the inventory information proposal AP is finished after closing of the shop to complete the processing (Step S214).

The above explains the flow of the processing of the inventory information proposal AP when the inventory reference request is made from the information terminal 16. This inventory information proposal AP can be utilized from the management terminal 25 for shop and from the management terminal 45 for headquarters.

The managers of the shop and the headquarters can look up the number of times of the inventory reference request during the object period of the commodity for each commodity code from the management terminals 25 and 45 by utilizing the trace information reference AP. Next, the processing operation of the trace information reference AP will be explained.

Figure 17:
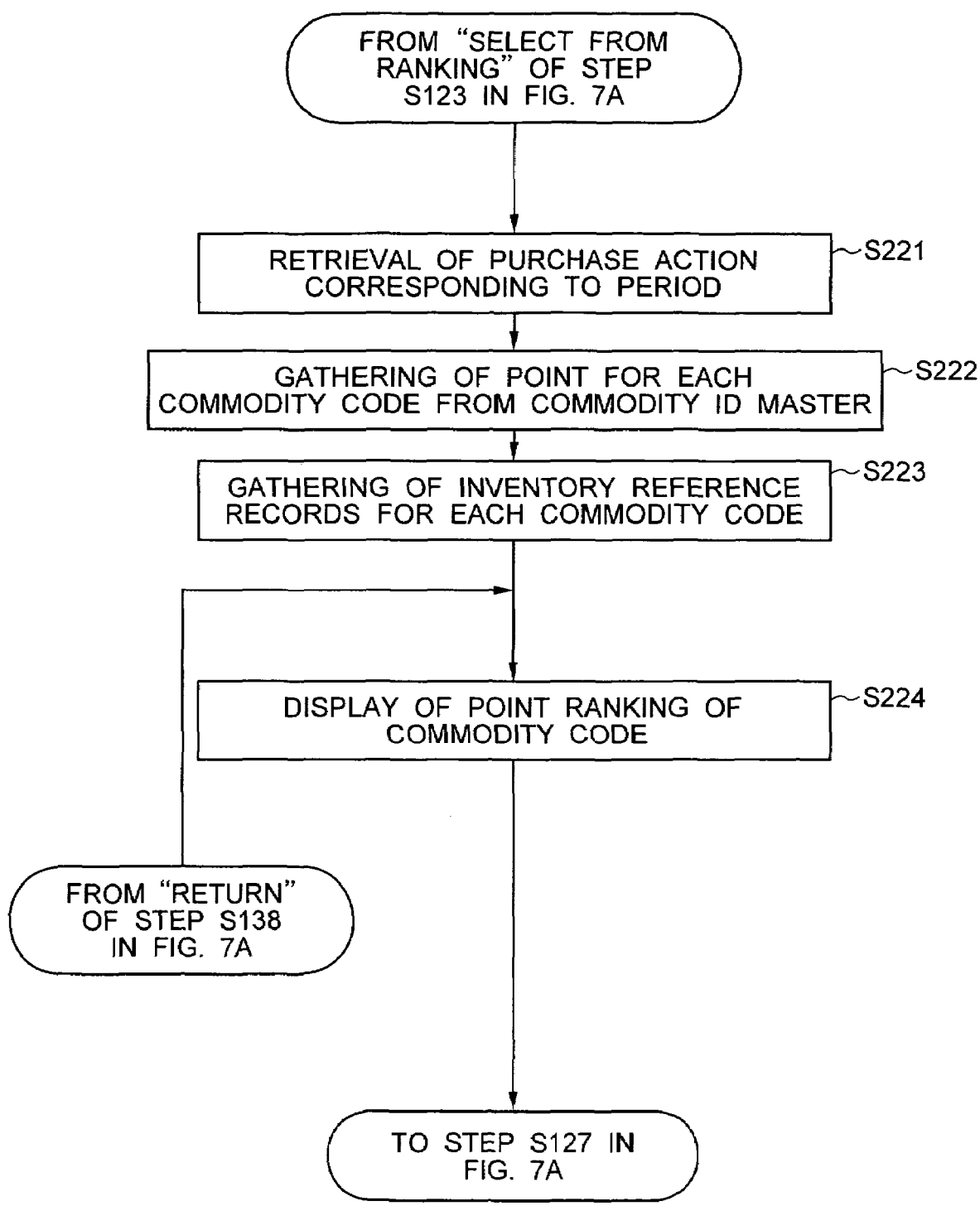
FIG. 17 is a flowchart useful for explaining a processing operation of a trace information reference AP when the number of times of inventory reference requests is looked up from the management terminal during an object period for each commodity code.

FIG. 17 is a flowchart for explaining the processing operation of the trace information reference AP when the number of times of the inventory reference requests during the object period for each commodity code from the management terminals 25 and 45. In the processing of the trace information reference AP of the second embodiment of the invention, the processing of from Step S124 to Step S126 in the processing flow shown in FIGS. 7A and 7B in the first embodiment is replaced by Steps S221 to S224 shown in FIG. 17. Here, only the flow from Step S221 to Step S224 will be explained.

(1) First, the records corresponding to the inputted object period and shop are extracted from the commodity trace information table 382 of the commodity trace DB 38 in the same way as in the first embodiment explained already. At this time, the records relating to the inventory reference such as the records 3825 and 3826 explained with reference to FIG. 16 are similarly extracted (Step S221).

(2) Next, the total point and the purchase number are gathered for the extracted records with the commodity tag ID being the key by looking up the tag ID master table 362 of the commodity ID master 36 in the same way as in the first embodiment (Step S222).

(3) Furthermore, the records 3825 and 3826 relating to the inventory reference and extracted by the processing of Step S221 are gathered for each commodity code and the number of times of the inventory reference is gathered for each commodity code. At this time, the number of times of the inventory reference when the inventory does not exist is also gathered from the inventory status 3822 (Step S223).

(4) The result gathered by the processing of Step S222 is sorted in the sequence of a higher total point in the same way as in the first embodiment and the point ranking table is generated and displayed on the management terminals 25 and 45. At this time, the number of times of the inventory reference and the number of times of the inventory reference when no inventory exists that are gathered by the processing of Step S223 are also displayed. FIG. 18 shows an example of the point ranking display screen 2240. In the ranking table 2241 shown in FIG. 18, the number of times of inventory reference and the number of times of inventory reference when no inventory exists are displayed respectively besides the rank 2242, the commodity code 2243, the commodity name 2244, the total point 2245, the number of purchase 2246 and the number of times 2248 of the inventory reference when no inventory exists that are shown in the first embodiment (Step S224).

The subsequent processing is executed in the same way as the processing after Step S127 shown in FIGS. 7A and 7B in the first embodiment.

In the example of the point ranking display screen 2240 shown in FIG. 18, only the number of times of the inventory reference is displayed but it is possible to look up the time at which the inventory reference is made, the commodity as the key of the inventory reference, etc, from the record of the commodity trace information table 382.

The above explains the flow of the processing of the trace information reference AP when the managers of the shop and headquarters look up the information about the inventory reference of the customers.

In the processing flow of the inventory information proposal AP and the trace information reference AP according to the second embodiment of the invention, the customer can confirm the inventory status from the information terminal without relying on the shop clerk and the managers of the shop and the headquarters can look up the actual record of the inventory reference of the customers that has not been possible in the past. Particularly because the inventory reference request can grasp the commodity that does not result in the sale owing to the absence of the inventory, it becomes possible to grasp popular commodities and to order such popular commodities.

The second embodiment of the invention can grasp the correct present positions of the commodities by looking up the inventory information DB. Therefore, it is possible to display the present status in further detail by changing the status in the commodity tag ID table shown in FIG. 10 to "shop warehouse", "shop front", return to center", "XX shop", and so forth.

Third Embodiment

The third embodiment of the invention to be explained next is directed to offer the purchase action information with attribute information of members to the managers of the shops and headquarters by utilizing the member information collected by member services carried out by shops in association with member information of those members who exhibit the purchase actions, in addition to the commodity information provided by the first embodiment of the invention explained above. Incidentally, the explanation of the construction of the third embodiment common to that of the first embodiment will be omitted.

The shop commodity information proposal system according to the third embodiment of the invention is different from the first embodiment shown in FIG. 1 in only that member information DB 41 is provided and that a member card loading port of customers is provided to the information terminal 16 and the cash register terminal 17.

The member information DB 41 stores the attribute information of the members as the object of the member service carried out by the shop 2 or the headquarters 4. A member card is generated for each member and the customer can acquire member services such as a discount or a point service by presenting the card at the time of payment. The member information DB 41 stores a member number, a member name, an address, age, sex, vocation, past purchase history, commodity retrieval history, and so forth, as the attribute information of the members.

In the third embodiment of the invention, the card loading port for the member is provided to the information terminal 16 and when the user loads the member card into the loading port, the information of the commodity purchased in the past can be looked up. When the commodity information is retrieved by loading the member card, the actual record is registered to the member information DB 41. The retrieval history can be looked up at the next time of use by using the information terminal 16 and this is useful for the purchase of the commodity.

The member card loading port is further formed to the cash register terminal 17. When the member card is loaded into the card loading port for payment, the point corresponding to the purchase amount is registered to the card and the commodity purchased can be registered as the history to the member information DB 41 from the member number (No.).

The application storage portion 32 of the information proposal server 3 according to the third embodiment of the invention stores the trace information registration AP and the trace information reference AP explained in the first embodiment. The detail of these AP and their processing will be described later.

First, the processing of the trace information registration AP in the third embodiment of the invention will be explained. The processing similar to the processing of the first embodiment shown in FIG. 6 is executed in the third embodiment, too, when the member card is not utilized.

Figure 19:
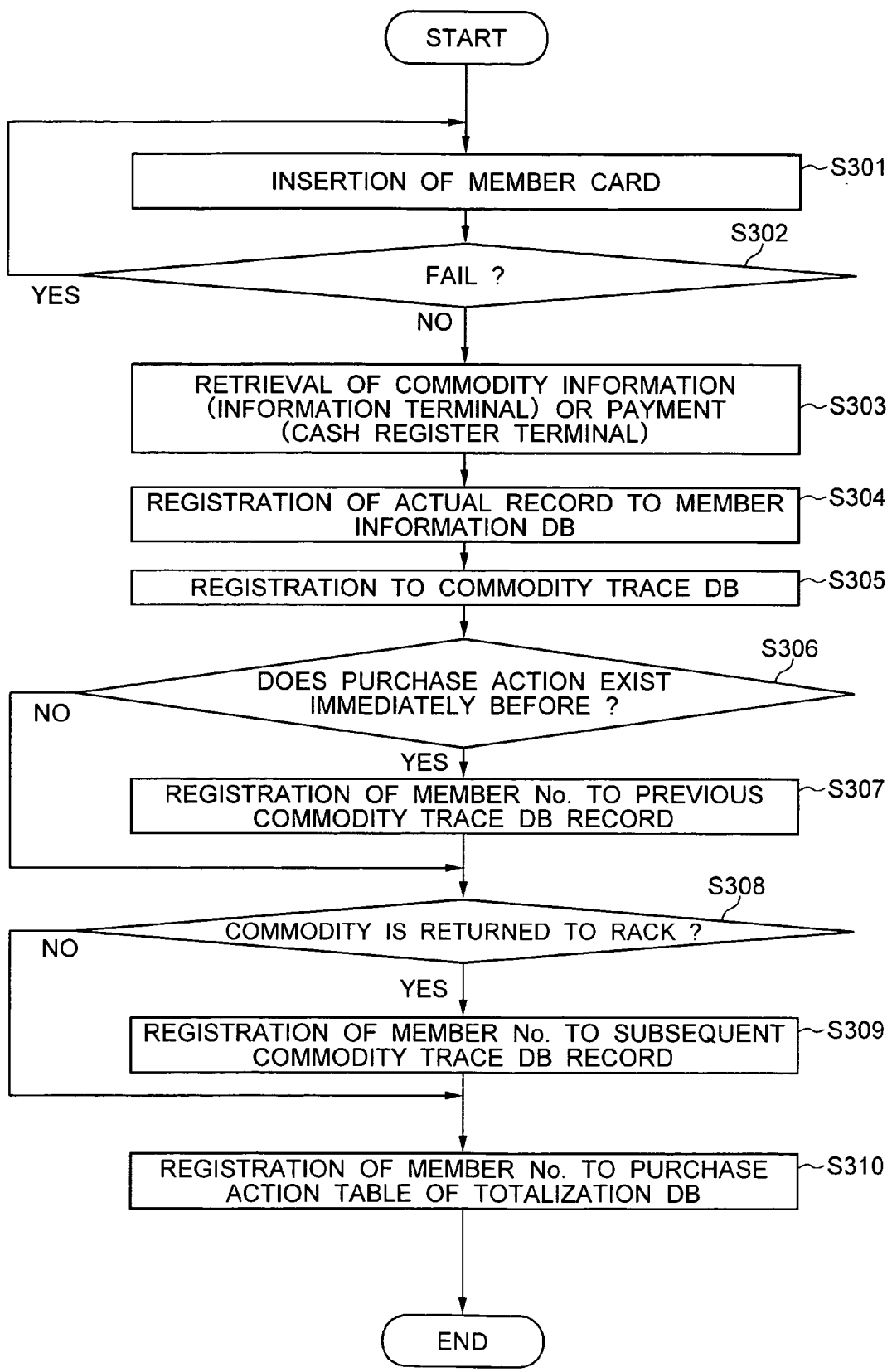
FIG. 19 is a flowchart useful for explaining a processing operation of a trace information registration AP when a member card is inserted into the information terminal or a cash register terminal.

FIG. 19 is a flowchart for explaining the processing operation of the trace information registration AP when the member card is loaded into the information terminal 16 or the cash register terminal 17. In the processing of the trace information registration AP according to the third embodiment of the invention, the flow from Step S103 to Step S112 in the flow of the first embodiment shown in FIG. 1 is replaced by the flow of Step S301 to Step S310 shown in FIG. 19. The explanation will be given on only the flow from Step S301 to Step S310.

(1) The customer or the shop clerk loads the member card into the card loading port when the information terminal 16 is utilized or when the payment is made at the cash register terminal 17. The information terminal 16 or the cash register terminal 17 reads the member number from the member card, confirms whether or not the corresponding member number exists in the member information DB 41 by asking the information proposal server 3, and judges whether or not the processing proves fail. When the result is the fail, the flow returns to the processing from Step S301 (Steps S301 and S302).

(2) When the judgment result is that the member number exists in the member information DB 41 and no fail exists in Step S302, the member number and the member name are displayed on the information terminal 16 and the cash register terminal 17. In the case of the information terminal 16, the user brings the IC tag of the commodity close to the antenna to retrieve the commodity information. In the case of the cash register terminal 17, the shop clerk brings the IC tag of the commodity to be paid close to the antenna and executes the payment processing (Step S303).

(3) The information terminal 16 and the cash register terminal 17 register the commodity tag ID of the commodity read with the date, etc, as the retrieval history and the purchase history to the member information DB 41 (Step S304).

(4) Next, the information terminal 16 and the cash register 17 register the commodity tag ID of the commodity read to the commodity trace information table 383 of the commodity trace DB 38. FIG. 20 shows a structural example of the commodity trace information table 383 according to the third embodiment of the invention. The member number (No.) 3833 of the commodity trace information table 383 shown in FIG. 20 represents the member No. of the member that makes the action. In the example shown in FIG. 20, the member No. 3833 is stored as represented by the record 3835 when the user loads the member card and utilizes the information terminal 16. This also holds true of the information registration from the cash register terminal 17 (Step S305).

(5) Whether or not the action of the same commodity tag ID exists in the commodity trace information table 38 before the information terminal 16 and the cash register terminal 17 read the commodity is retrieved. In other words, whether or not the record representing the action read by terminals other than the information terminal 16 and the cash register terminal 17 exists immediately before the record registered in the processing S304 such as the action of the customer of picking up the commodity from the display rack or the action of carrying the commodity into the fitting room is retrieved (Step S306).

(6) When the purchase action is judged as existing in Step S306, the corresponding record can be regarded as the action made by the same member as the action registered to the commodity trace information table 383 in Step S305. Therefore, the same member No. registered in Step S304 is registered to the member No. 3833 of all the records of the latest action registered in Step S305 from the record of the rack (pickup). In the example shown in FIG. 20, the member No. of the record is registered to the member No. 3833 of the record 3836 (Step S307).

(7) When the purchase action immediately before is not judged as existing in Step S306 or after the processing of Step S307, whether or not the action of returning the commodity to the display rack is registered to the commodity trace information table 383 is judged (Step S308).

(8) When the action of retuning the commodity to the display rack is judged as being registered in Step S308, all the actions ranging from the action registered to the commodity trace information table 383 by the processing of Step S305 to the action of returning the commodity to the display rack may possibly be the actions made by the member registered in Step S304. Therefore, the member No. registered is registered to the member No. 3833 of the records of the subsequent actions. In the example shown in FIG. 20, the record No. of the records is registered to the member No. 3833 of the records 3837 and 3838 (Step S309).

(10) When the action of returning the commodity to the display rack is not judged as being registered in Step S308 or after the processing of Step S309, the purchase action is registered to the totalization DB 39 when the action in Step S112 in FIG. 6 of the first embodiment is the action of returning the commodity to the rack or the payment at the cash register. In this third embodiment, too, the action from picking up of the commodity to returning of the commodity to the display rack or the payment at the cash register is registered as one purchase action. FIG. 21 shows a structural example of the purchase action table 393 in the third embodiment. As shown in FIG. 21, the member No. acquired by the processing in Step S302 is registered to the member No. 3931 of the purchase action table 393 (Step S310).

The above explains the processing flow of the trace information registration AP when the member card is utilized at the information terminal 16 and the cash register terminal 17.

The managers of the shop and the headquarters can look up the information about the members and their attributes that make the purchase action by utilizing the trace information reference AP from the management terminals 25 and 45. For example, the managers can grasp the age and sex of the member, popular commodities for each vocation, and so forth, by designating a narrowing condition about the attribute information of the members and extracting only the customers' actions corresponding to the narrowing condition.

Figure 22:
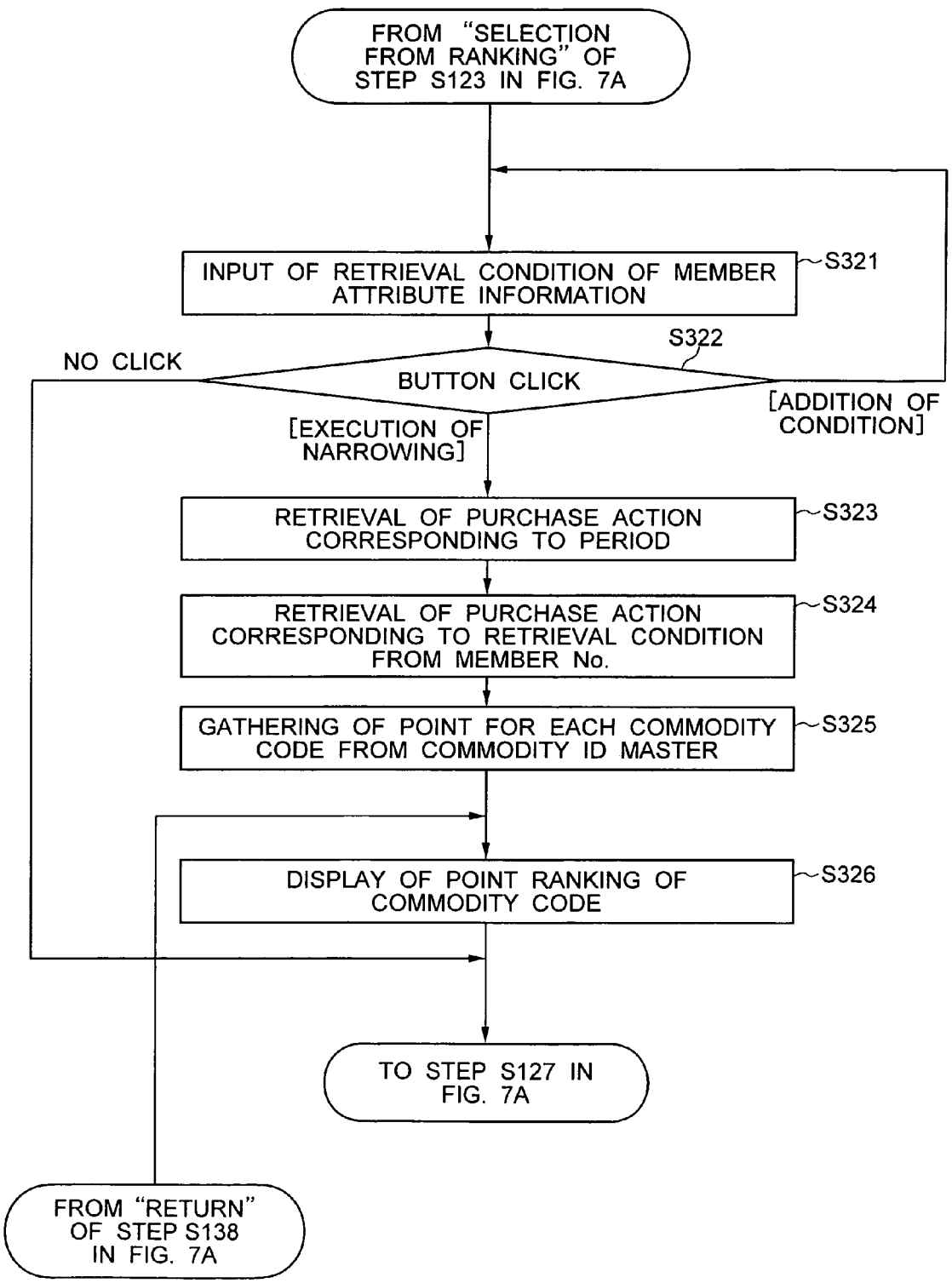
FIG. 22 is a flowchart useful for explaining a processing operation of a trace information reference AP in the third embodiment of the invention.

FIG. 22 is a flowchart for explaining the processing of the trace information reference AP according to the third embodiment of the invention. Next, the processing of the trace information reference AP under the condition described above will be explained with reference to FIG. 22.

In the processing of the trace information reference AP according to the third embodiment of the invention, the processing from Step S124 to Step S126 in the processing flow shown in FIGS. 7A and 7B in the first embodiment is replaced by the processing from Step S321 to Step S326 in FIG. 22. The explanation will be hereby given on only the flow from Step S321 to Step S326.

Figure 23:
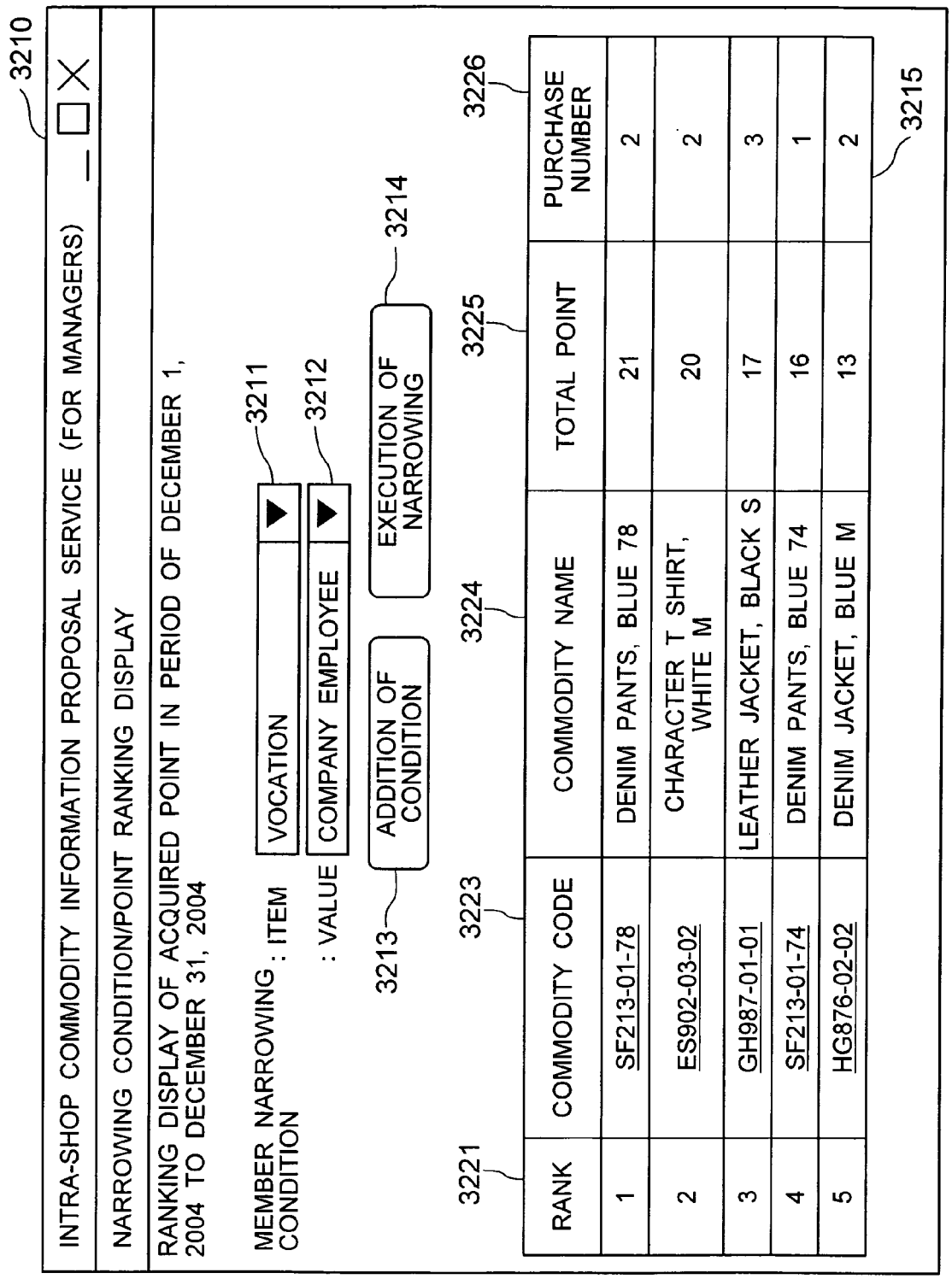
FIG. 23 shows an example of a narrowing condition/ranking display screen.

(1) First, to use the items stored in the member information DB 41 for the narrowing condition, the user selects the items of the condition and the values from the screen displaying them. FIG. 23 shows an example of a narrowing condition/ranking display screen 3210. The user selects the items for the condition from an item selection pull-down 3211. This item selection pull-down 3211 displays the items of the member information DB 41 as the applicant. The user further selects the values of the selected items from a value selection pull-down 3212 as the narrowing condition. The value selection pull-down 3212 displays the values registered to the member information DB 41 as the applicant. The ranking table 3215 without narrowing is displayed at the lower part of the screen before the narrowing condition is inputted (Step S321).

(2) When the narrowing condition is inputted and the narrowing condition is desired to be increased, an additional condition can be inputted by clicking a condition addition button 3213. Because the user clicks a narrowing execution button 3214 after all the narrowing conditions are inputted, which button is clicked is judged. When the condition addition button 3213 is clicked, the flow returns to the processing from Step S321 to further carry out the input of the narrowing condition (Step S322).

(3) When the narrowing execution button 3214 is judged as being clicked in Step S322, the information proposal server 3 receives the condition inputted from the management terminals 25 and 45 and first retrieves and extracts the records of the corresponding purchase action during the inputted period from the purchase action table 393 (Step S323).

(4) Next, the records having the member No. 3931 registered are selected from the records extracted in Step S323. The member No. 3931 registered to each record is retrieved from the member information DB 41 and only the corresponding records are extracted by checking whether or not the attribute information of the member No. corresponds to the narrowing condition inputted by the processing of Step S322 (Step S324).

(5) The corresponding commodity code is retrieved from the commodity ID master 36 with the commodity tag ID registered to the records of the purchase action narrowed by the processing of Step S324 as the key and the total point and the purchase number in the records of the purchase action are gathered for each commodity code (Step S325).

(6) The point ranking table is generated by sorting the gathering results of Step S325 in the sequence of a higher total point in the same way as in the first embodiment and the ranking table 3215 of the narrowing condition/ranking display screen 3210 is again displayed as shown in FIG. 23. The ranking table 3215 displays the point sequence 3211, the commodity code 3223, the commodity name 3224, the total point 3225 and the purchase number 3226 (Step S326).

The subsequent processing is executed in the same way as the processing after Step S127 of the first embodiment shown in FIGS. 7A and 7B. In the embodiment described above, the explanation has been made on the premise that the ranking table is generated and displayed in accordance with the higher total point but may be generated and displayed in accordance with the purchase number in the same way as in the first embodiment.

The above explains the flow of the processing of the trace information reference AP when the managers of the shop and the headquarters look up the total point and the purchase number after the purchase action of the customer is narrowed by the attribute information of the members.

In the purchase action table 1311 of the first embodiment shown in FIG. 11, too, the attribute information of the member actually making the purchase action can be looked up from the purchase action table 393 with the member No. 3931 as the key.

According to the processing flow of the third embodiment of the invention, the member as the customer can look up not only the past purchase history but also the retrieval history for retrieving the commodity information from the information terminal. Consequently, when the member again visits the shop, the member can confirm and purchase the commodity in which the member was interested in his last visit. The managers of the shop and the headquarters can grasp the difference of the popular commodities depending on the difference of the member attribute information and the difference of the purchase actions.

The processing of each of the embodiments described above can be constituted by a program which can be executed by a CPU provided to a computer. The program can be stored in recording media such as FD, CDROM, DVD, etc, and can be provided in the storage form.

The first to third embodiments of the invention have thus been described but the invention can be constituted into other embodiments.

For example, as a fourth embodiment of the invention, it is possible to employ the construction in which the shop commodity information proposal service for the managers of the shop and headquarters is provided also to the customers through the information terminal at the shop front. In this case, a recommended commodity DB is provided to the shop commodity information proposal system 1 explained above and "commodity point table updating AP" and "popular commodity information proposal AP" are stored in the application storage portion 32 of the information proposal server 3 besides the AP explained in the first embodiment.

The commodity point table of the commodities the information of which is proposed as the recommended commodities to the customers is stored in the recommended commodity DB, and when the information proposal request is made from the customer, the commodities registered to the table are proposed as the recommended commodities by looking up this table. This commodity point table stores the information for ranking the commodities from the total point and the purchase number in the first embodiment and is used for providing the information proposal of the commodities as the recommended commodities to the customers through the information terminal.

The proposal of the commodity information may be conducted in such a fashion as to display the purchase number and overall scores of the recommended commodities and the total point on the information terminal 16 or to display only the rank, the commodity name and the simultaneous purchase recommended commodity when such information is not preferably disclosed to the customers. Those commodities which are popular inside the shop may be proposed as the commodities having a high overall score or those commodities having a high total point may be proposed as the commodities popular inside the shop.

According to the fourth embodiment described above, the customer can know two kinds of commodities, that is, good selling commodities and commodities drawing a high attention inside the shop. In the case of apparels and accessories, in particular, there are many customers who want to purchase unique commodities besides those who want to buy good selling commodities. When the information of the commodities that are often picked up or carried into the fitting room is provided to such customers, their purchase motivation can be promoted. Because the database of the recommended commodities can be automatically generated from the commodity trace information inside the shop, the commodity information can be proposed to the customers without increasing the load to the managers of the shop and headquarters.

In the fourth embodiment described above, the database of the recommended commodities is automatically generated from the commodity trace information inside the shop, whereas in a fifth embodiment, the information proposal of those commodities which the managers of the shop and headquarters want to appeal to the customers can be offered as the recommended commodities. In this case, a recommendation designated commodity table storing in advance those commodities that are to be recommended to customers is stored beforehand in the recommended commodity DB of the fourth embodiment, besides the commodity point table explained in the fourth embodiment. The application storage portion 32 of the information proposal server 3 stores "recommendation designated commodity registration AP" besides the AP explained in the fourth embodiment. When the customer looks up the recommended commodity from the information terminal 16, the commodities of the recommendation designated commodity table can be proposed.

According to the fifth embodiment described above, the managers of the shop and headquarters can propose the commodity information of the recommended commodities together with the popular commodities and good selling commodities to the customers when the managers desire the customers to particularly recognize commodities such as new commodities or campaign commodities.

In each of the embodiments of the invention described above, the explanation has been made on the assumption that the shop data management portion 34 manages the shop commodity information for each shop. However, it is possible in the invention to gather the commodity trace DB 38 and the totalization DB 39 stored in the shop data management portion 34 of all the shops into one and to put the shop code to each table. Alternatively, it is further possible to mutually look up the shop data management portions 34 among the shops and to execute the trace information reference AP, the inventory information reference AP, and so forth.

The products as the object are not limited to the apparels and accessories but may be foodstuff, general goods, books, CD and DVD of music and movies, home electric appliances, sports and outdoor goods, and so forth.

In each of the foregoing embodiments of the invention, the explanation has been given on the premise that the IC tag attached to the commodity is the one that has the built-in IC chip for storing only the unique ID in the memory. However, the invention may use an IC tag having a memory into which the commodity code is written besides the unique ID, and which can directly read the commodity code from the IC tag without passing through the commodity ID master.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

The invention claimed is:

1. A commodity information proposal system comprising:
   identifier read means installed at a plurality of positions inside a shop, for reading an identifier attached to each commodity inside the shop;
   a server for receiving a read result from said identifier read means, storing said read result therein and analyzing behaviors of customers from said read result; and
   input/output means for outputting the analyzed data of behaviors of customers:
   said identifier read means, said input/output means and said server being connected to one another through a communication line;
   wherein said server analyses the behaviors of the customers which include at least pick-up of the commodity in the shop, returning of the commodity to where the commodity was picked-up, purchasing of the commodity, and not purchasing the commodity, from the read result of one or a plurality of said identifier read means;
   associates the behaviors of the customers with the time of occurrence of the respective behaviors, assigns point values to the respective behaviors weighted in accordance with each kind of the behaviors and totals the point values with respect to the commodity through said input/output means; and
   transmits the total point value information and the information of behaviors as the basis of the point value totals to said input/output means in accordance with a request from said input/output means.

2. A commodity information proposal system as defined in claim 1, further comprising:
   information proposal means for proposing commodity information inclusive of inventory information of commodities to the customers, connected to said communication line;
   wherein said server further manages inventory information for each commodity, transmits an inventory status in accordance with an inventory retrieval request from said information proposal means for the customers, stores said request and the inventory status as an inventory retrieval history and transmits said inventory retrieval history to said input/output means in accordance with a request of said input/output means.

3. A commodity information proposal system as defined in claim 2, further comprising:
   customer identification means for individually identifying the customers, further connected to said communication line;
   wherein said server receives an identification result by said customer identification means, in case of receiving the read result of said identifier read means or the inventory retrieval request from said information proposal means for customers, adds the identification result to the information of the behaviors of customers or to the record of the inventory retrieval history, and correlates said inventory retrieval history coincident with attribute information of the customers contained in the request in accordance with the request from said input/output means and transmits the result to said input/output means.

4. A commodity information proposal system as defined in claim 2, wherein said server further transmits the information of said behaviors or behavior of customers as the basis of the point value totals to said information proposal means in accordance with the request from said information proposal means for customers.

5. A commodity information proposal system as defined in claim 4, wherein said server transmits commodity information separately registered in advance from said input/output means in accordance with the request from said information proposal means for customers.

6. A commodity information proposal system comprising:
   identifier read means for reading an identifier attached to each commodity to detect events of moving a commodity from a predetermined display position, and returning the commodity back to the predetermined display position;
   a cash register terminal having an antenna for reading therethrough the identifier attached to the commodity to process a payment for the commodity at the cash register;
   a server for retrieving the information of the moving and returning events from the identifier read means and the information of the payment from the cash register terminal, and input/output means for inputting information into the server and outputting information from the server; wherein said server is configured to store the information of the events and time at which the events occur wherein said events include at least moving of the commodity from the display position, returning of the commodity back to the display position and the payment for the commodity, assigning point values to the events weighted in accordance with the kind of the events and totaling the point values for each commodity, and transmitting the point value totals of the events and the information of the events as the basis of the point value totals to the input/output means.

7. A commodity information proposal system as defined in claim 6, further comprising:

said server is configured to manage inventory information, transmit the inventory information to a terminal which the customer uses in response to the reception of an inventory retrieval request from the customer through the terminal, and add the inventory retrieval request to the information of the events.

8. A commodity information proposal system as defined in claim 7, further comprising:

a database having the information of the customer;

wherein said server is configured to store therein together the information of the customer and the inventory retrieval request.

9. A commodity information proposal system as defined in claim 8, in response to a request from the terminal which the customer uses, said server transmits the information of the events as the basis of the point value totals to the terminal which the customer uses.

10. A commodity information proposal system as defined in claim 9, wherein in response to the request from the terminal which the customer uses, said server transmits the information of the commodity to the terminal which the customer uses.

* * * * *